(12) United States Patent
Matsugu et al.

(10) Patent No.: US 6,674,905 B1
(45) Date of Patent: Jan. 6, 2004

(54) IMAGE PROCESSING METHOD, IMAGE PROCESSING APPARATUS, AND STORAGE MEDIUM

(75) Inventors: Masakazu Matsugu, Chiba (JP); Toshiaki Kondo, Singapore (SG); Fumiaki Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/488,792

(22) Filed: Jan. 21, 2000

(30) Foreign Application Priority Data

Jan. 22, 1999 (JP) ............................................. 11-014680
May 27, 1999 (JP) ............................................. 11-148190

(51) Int. Cl.⁷ ................................................. G06K 9/48
(52) U.S. Cl. ........................................ 382/199; 382/181
(58) Field of Search ................................ 382/181, 199, 382/162

(56) References Cited

U.S. PATENT DOCUMENTS

| | | | | |
|---|---|---|---|---|
| 5,471,535 A | * | 11/1995 | Ikezawa et al. ............. | 382/199 |
| 5,475,507 A | * | 12/1995 | Suzuki et al. ............... | 358/500 |
| 5,579,409 A | * | 11/1996 | Vaidyanathan et al. ...... | 382/203 |
| 5,731,849 A | | 3/1998 | Kondo et al. ............... | 348/699 |

\* cited by examiner

Primary Examiner—Brian Werner
Assistant Examiner—Tom Y. Lu
(74) Attorney, Agent, or Firm—Fitzpatrick, Cella, Harper & Scinto

(57) ABSTRACT

When a dispersion value of a shading value is equal to or more than a threshold value in the neighborhood of a standard point, it is determined that an image pattern has a texture dominant characteristic. When the value is less than the threshold value, a change of the shading value is determined to be moderate (S11). When the dispersion value is equal to or more than the threshold value (S11), a texture characteristic amount is loaded (S12), a characteristic amount suitable for area growth (e.g., texture energy) is calculated (S13), and a distance $D_T$ concerning the texture characteristic amount is obtained (S14). When the dispersion value is less than the threshold value (S11), a color component characteristic amount is loaded (S16), a characteristic amount suitable for the area growth (e.g., a characteristic vector obtained from a local histogram concerning a color component or a list of representative color components) is extracted (S17), and a distance $D_C$ concerning the color component is obtained (S18). The area is grown based on the corresponding characteristic amount (S15, S19), and a renewal position is determined based on a new borderline of a core area obtained by unifying area growth results from standard points (S20).

23 Claims, 15 Drawing Sheets

FIG. 3A  
CORE
FIG. 3B  
CORE
FIG. 3C  
CORE
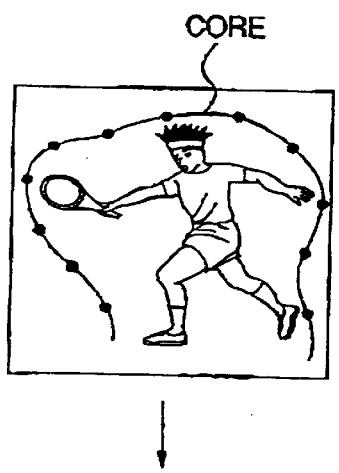  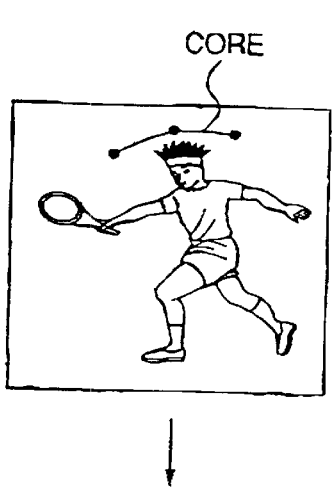
FIG. 3D
FIG. 3E
FIG. 3F
  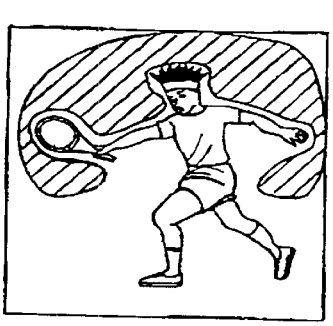
FIG. 3G

| θ | Vx(θ) | Vy(θ) |
|---|---|---|
| 0 | 1 | 0 |
| 45 | 1 | 1 |
| 90 | 0 | 1 |
| 135 | -1 | 1 |
| 180 | -1 | 0 |
| 225 | -1 | -1 |
| 270 | 0 | -1 |
| 315 | 1 | -1 |

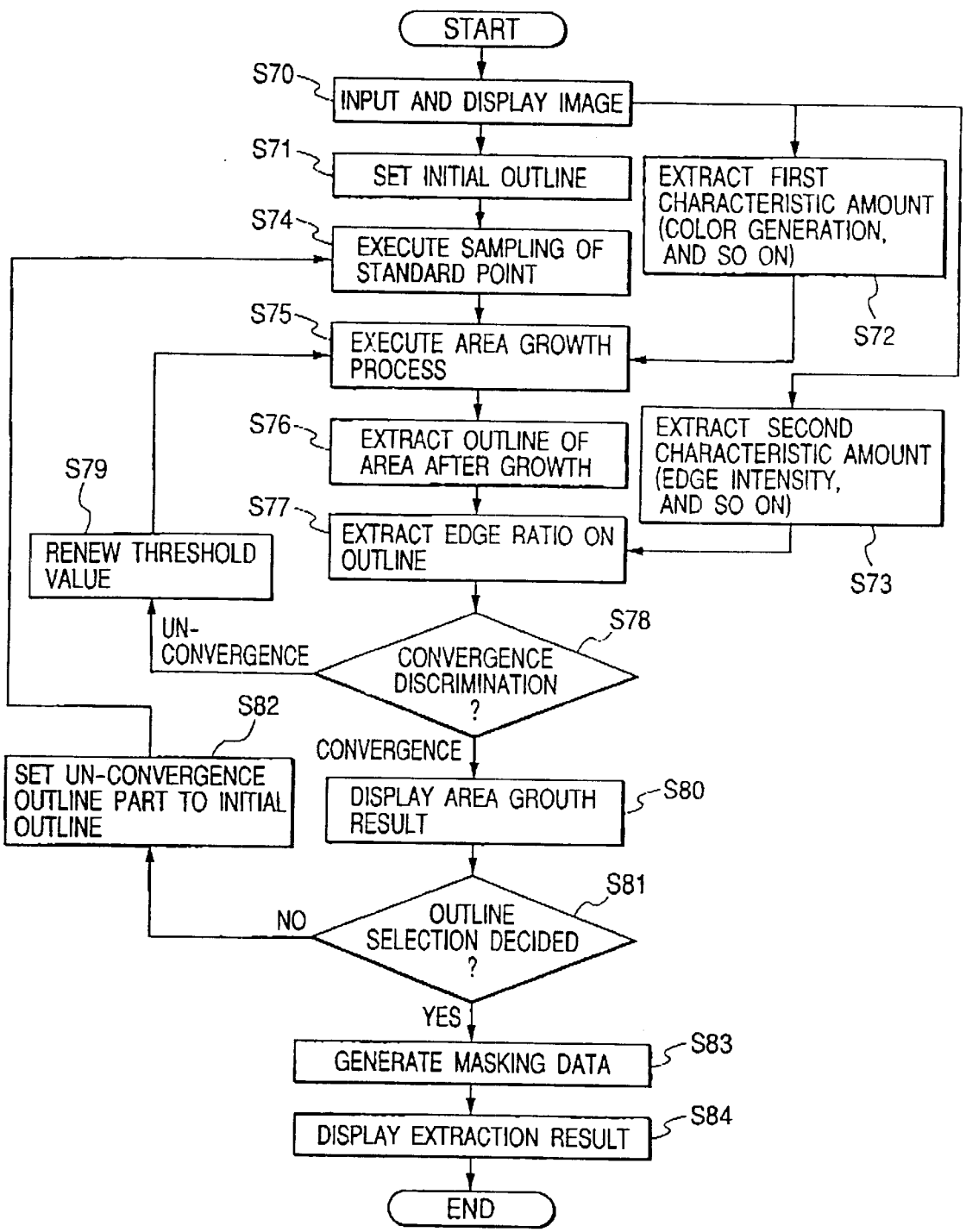

INITIAL OUTLINE

INITIAL OUTLINE

INITIAL OUTLINE

IMAGE PROCESSING METHOD, IMAGE PROCESSING APPARATUS, AND STORAGE MEDIUM

BACKGROUND OF THE INVENTION

1. Field of the Invention

The present invention relates to an image processing method, an apparatus and a storage medium.

2. Related Background Art

A conventional method of cutting out a specific object from an image includes; a method comprising selecting an area having a color component value (or a shading value) of a predetermined range including a pixel value of an object designated by a user or a point on background, and repeatedly removing the background or designating the area of an extraction object; a method comprising designating a rough outline area or a local area including the outline of an extraction object, and forming fine lines or clustering in the designated area to obtain and cut out an object border outline; and the like.

Moreover, a method is also known which comprises using only the color component only to set a closed curve (or the borderline of a polygon) so that the image part of the extraction object is roughly surrounded, and generating a cut out mask image with a shape substantially close to the shape of the extraction object.

Furthermore, also known is a method in which an input image is divided into areas having similar colors or areas having similar space frequencies, and a user performs an operation of selecting an image area constituted of an area to be extracted from the divided areas to extract a desired object image.

In contrast to these methods, a method is known which comprises generating an initial closed curve inside the extraction object, performing an expansion processing of the closed curve to move a sampling point position linearly outward to an edge or another characteristic point position in a radial direction passed through a sampling point on the closed curve from a central point, and determining the shape of the extraction object.

In the method of selecting the area having the color component value of the predetermined range while designating the area of the extraction object, when the object is constituted of the areas locally having a large number of color components, or when the border of the background and the object has a low contrast and cannot easily be distinguished only with a pixel property, a very large number of labors (the designation of a color component selection range, point designation in the extraction object, and the like) are required. Moreover, even when the operating property is enhanced by disposing means for arbitrarily changing the size of the extraction area, it is difficult in principle to distinguish the background from the object to be extracted only with the shading value for extraction.

In the method of designating the rough outline including the outline of the extraction object, when the width of the rough outline is small, the rough outline has to be set with considerable attention so that the outline does not deviate from a true outline. Moreover, with a large width of rough outline, even by forming the fine lines or clustering to obtain the extraction object outline, when the border of the extraction object has a low contrast, and when the object outline in the rough outline has a complicated shape, it is difficult to extract the true outline. Even in the method of designating the local area, performing the area division or the border determination in the area, moving the local area so as to trace the extraction object outline and successively extracting the borderline, the considerable attention and labors are required for the user's operation.

For the method of designating the closed curve roughly surrounding (the area roughly including) the image part of the extraction object, even in a system based on the ratio of the area having the sale color component as that included in the closed curve, when there is an area having the same color as that of the object in the background in the closed curve, and when the closed curve area has double or more area as compared with the area to be cut out, there is a problem that wrong extraction is easily caused, for example, a background part is extracted.

In the method in which the user selects the area to be extracted from the results obtained beforehand by performing the area division by the color component and the area division based on the space frequency component, when the optimum area division is not performed, the number of small divided areas belonging to the area to be extracted increases, thereby increasing the labor of selection by the user. When the borderline of the area division does not meet the extraction object outline, much labor for repair is required. Moreover, since the operation is performed on the entire image, in some cases, the processing load is unnecessarily excessively enlarged by the originally unnecessary area division in the background part, and the result cannot be obtained at a high speed.

Moreover, in the system premising the extraction object recognition processing or the outline recognition processing, in the present situation it is usually difficult to recognize the extraction object or the outline. For example, since there are prerequisites that the extraction can be recognized based on the specific color component, no object outline other than the outline of the extraction object is present in the closed curve, and that the outline can be recognized otherwise, the system has no general-purpose property, and is difficult to use.

The method of expanding the closed curve inside the extraction object to divide the area is performed at a high speed, but usually a large number of closed curves need to be set in appropriate positions inside the extraction object area. It is difficult to automate the closed curve setting, while manual setting vainly increases labors.

SUMMARY OF THE INVENTION

An object of the present invention is to provide an image processing method, an apparatus and a storage medium which solve the above-described disadvantages.

To attain the above-described object, according to one preferred embodiment of the present invention, a core designated by at least one of a predetermined point, line segment and area is set in an image, an evaluation function including a texture characteristic amount is calculated in a local area constituted of at least one standard point constituting the core, and the shape of the core is renewed based on the value of the evaluation function to determine the borderline of a predetermined area in the image.

Moreover, to achieve the above-described object, according to one preferred embodiment of the present invention, there is provided an image extracting method comprising: a core setting step of setting a core designated by at least one of a predetermined point, line segment and area in an image; a standard point setting step of setting a representative point set on the core as a standard point; a similarity calculating step of obtaining a similarity of a neighborhood area image of the standard point and a neighborhood area image of an attention point based on a characteristic amount distance obtained by weighting and adding a first distance between two points in a characteristic space based on a color component characteristic amount with respect to the attention point given in a predetermined method and the standard point, and a second distance between the two points in the characteristic space based on a texture characteristic amount; an extraction area renewing step of combining the attention point or the neighborhood area with a predetermined extraction area including the standard point when the similarity is larger than a predetermined threshold value, or removing the attention point or the neighborhood area from the extraction area when the similarity is equal to or less than the threshold value and when the attention point is included in the extraction area, to renew a borderline of the extraction area; and a borderline display step of displaying the renewed borderline of the extraction area.

Furthermore, to achieve the above-described object, one preferred embodiment of the present invention comprises: an initial outline setting step of setting an initial outline present inside or outside an object to be extracted; a standard point setting step of setting a plurality of predetermined representative points set on the initial outline as standard points; a similarity calculating step of obtaining a similarity of a neighborhood area image of the standard point and a neighborhood area image of an attention point based on a characteristic amount distance obtained by weighting and adding a first distance between two points in a characteristic space based on a color component characteristic amount with respect to the attention point given in a predetermined method and the standard point and a second distance between the two points in the characteristic space based on a texture characteristic amount; an extraction area renewing step of combining the attention point or the neighborhood area with a predetermined extraction area including the standard point when the similarity is larger than a predetermined threshold value, or removing the attention point or the neighborhood area from the extraction area when the similarity is equal to or less than the threshold value and when the attention point is included in the extraction area, to renew a borderline of the extraction area a predetermined number of times; and a threshold value setting step of determining the threshold value based on an edge ratio on an inner borderline of the renewed extraction area when the entire initial outline is present outside the object, or determining the threshold value based on the edge ratio on an outer borderline of the renewed extraction area when the entire initial outline is present inside the object.

Additionally, to achieve the above-described object, one preferred embodiment of the present invention comprises an initial outline setting step (unit) of setting an initial outline having an arbitrary shape outside or inside a predetermined object area in an image; a characteristic amount extracting step (unit) of extracting a first characteristic amount from the image; a modifying step (unit) of modifying the initial outline based on the first characteristic amount and a first threshold value processing; a convergence determining step (unit) of extracting a second characteristic amount at a predetermined sampling point on the modified outline, and determining convergence of the outline by a second threshold value processing of a predetermined evaluation function value concerning the second characteristic amount; and a threshold value renewing step (unit) of renewing a threshold value in the first threshold value processing.

The present invention relates to an image processing apparatus, an image processing method, and a storage medium which have inventive functions.

Further functions and characteristics of the present invention will be apparent from the following drawings and embodiments.

BRIEF DESCRIPTION OF THE DRAWINGS

FIGS. 3A, 33, 3C, 3D, 3E, 3F and 3G are diagrams showing the progress of a processing system in the embodiment.

FIG. 13 is a processing flowchart of the constitution shown in FIG. 12.

DETAILED DESCRIPTION OF THE PREFERRED EMBODIMENTS

Embodiments of the present invention will be described hereinafter with reference to the drawings.

Figure 1:
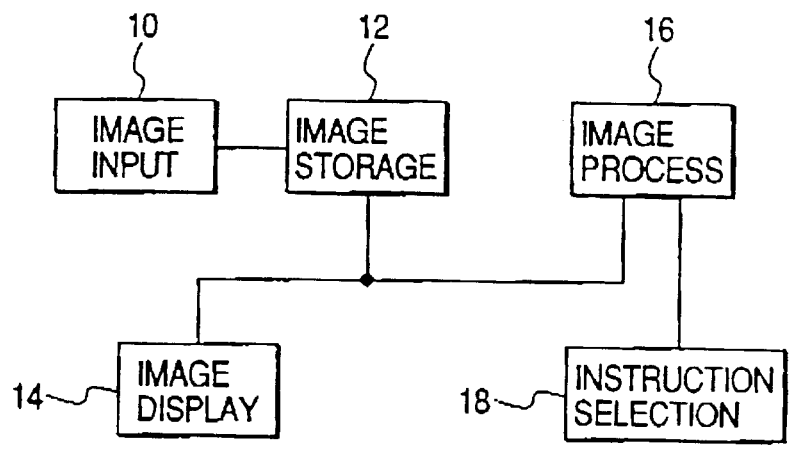
FIG. 1 is a basic constitution block diagram of one embodiment of the present invention.

FIG. 1 is a schematic block diagram of one embodiment of the present invention. Numeral 10 denotes an image input apparatus, 12 denotes an image storage apparatus, 14 denotes an image display, 16 denotes an image processing apparatus, and 18 denotes an instruction selection apparatus constituted of pointing devices such as a mouse. The image input apparatus 10 is constituted of an image pickup apparatus such as an image scanner and a digital camera, or an image data transfer apparatus connected to an image database.

In the present embodiment, image data including an object to be separated/extracted from background is inputted from the image input apparatus 10, and stored in the image storage apparatus 12. The image data stored in the image storage apparatus 12 is displayed with a predetermined format in a predetermined position on the screen of the image display 14.

Figure 2:
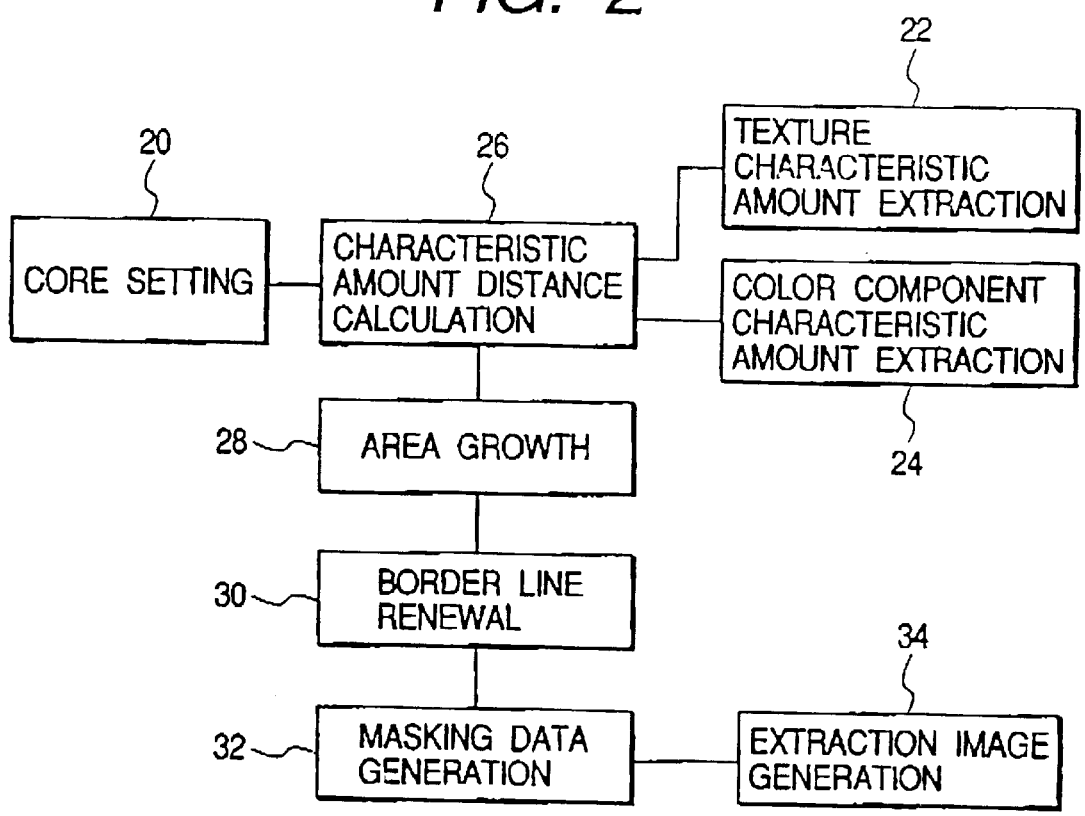
FIG. 2 is a schematic block diagram of a first example of an image processing apparatus 16.

FIG. 2 is a schematic block diagram of the image processing apparatus 16. Numeral 20 denotes a core setting apparatus, 22 denotes a texture characteristic amount extraction apparatus, 24 denotes a color component characteristic amount extraction apparatus, 26 denotes a characteristic amount distance calculation apparatus for calculating a characteristic amount distance in a characteristic space, 28 denotes an area growth apparatus for growing an area based on the characteristic amount distance, 30 denotes a borderline renewal apparatus for obtaining the borderline of a core obtained as a result of area growth, 32 denotes a masking data generation apparatus, and 34 denotes an extraction image generation apparatus. The image processing apparatus 16 is provided with a storage apparatus (not shown) for temporarily storing an in-process data.

In the present embodiment, the "core" indicates a seed of growth of a point, a line segment including a curve or an arbitrarily shaped area. FIGS. 3A, 3B, 3C show one example of an initial core. FIGS. 3A, 3C show an example in which a user looks at the image displayed on the screen of the image display 14 to perform designation by the instruction selection apparatus 18. FIG. 3B shows an example in which four sides of an image outer frame are set as an extraction processing object are set as the core. The user may designate the arbitrary side (or sides) from four sides constituting a frame.

Figure 4:
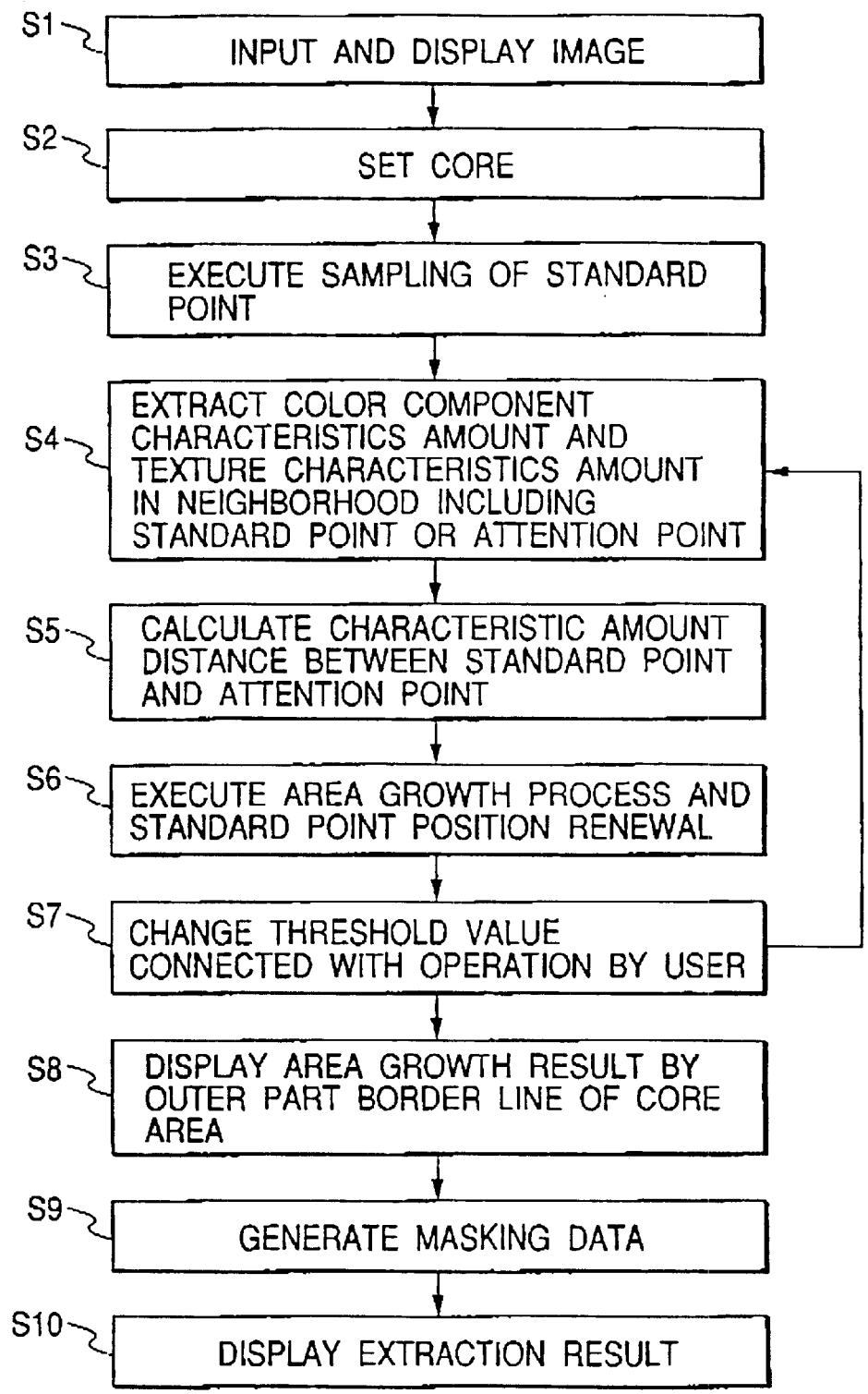
FIG. 4 is an operation flowchart of the image processing apparatus 16 shown in FIG. 2.

FIG. 4 is an operation flowchart of the present embodiment. The operation of the present embodiment will be described with reference to FIG. 4.

The image data is inputted to the image storage apparatus 12 from the image input apparatus 10, and displayed on the screen of the image display 14 (S1). The user looks at the displayed input image to set the core (S2). For example, when a curved core is set, the user sets the curve with an arbitrary shape by the instruction selection apparatus 18 so as to surround the object to be cut out of the image displayed on the image display 14. This curve may be a closed curve surrounding the extraction object, or a curve with an arbitrary shape which is present in the vicinity of the extraction object and is not closed. Specifically, when the position of a cursor (not shown) displayed on the image display 14 is decided, the button of the instruction selection apparatus (mouse) 18 is pushed, and the cursor is moved on the screen so as to draw a curve locus surrounding the extraction object, a smooth curve is generated which connects sampling points obtained by sampling the points on the locus at a predetermined interval, and this forms the initial core. Additionally, when the mouse is clicked at a plurality of arbitrary points outside the extraction object, the core setting apparatus 20 connects the clicked points with a straight line to generate the core.

After the core is generated, the standard point constituting the core is sampled (S3). For example, when the curve is set as the core, the point on the curve is sampled in a discrete manner at a predetermined interval and set as the standard point. In FIGS. 3A, 3B, 3C black round points arranged on the core are standard points. When the core is designated as the point, this point may be set as the standard point, or sampling may be executed by automatically using a plurality of positions in the vicinity of the point as the standard points.

The characteristic amount is extracted in the neighborhood including the standard point or an attention point (an arbitrary sampling point not present on the core, usually employed from the neighborhood of the standard point) (S4). It is to be judged whether or not the attention point is combined with the area including the standard point, and the attention point is usually present outside the extraction area, and in the neighborhood of the standard point. In the present embodiment, a texture characteristic amount and a color component characteristic amount are employed as the characteristic amount.

A method of extracting the texture characteristic amount by the texture characteristic amount extraction apparatus 22 will be described. In the present embodiment, the shading value of the input image (when the input image data is a color image, the image is converted to a shaded image) is subjected to Gabor wavelet transformation, and the texture characteristic amount is extracted by the conversion factor.

As shown in the following equation (1), Gabor wavelet has a shape obtained by modulating a sinusoidal wave having a constant direction component and a space frequency with Gaussian function, and is specified by an index m of a scaling level and an index n of a direction component.

$$g_{mn}(x, y) = (a^{-m}/2\pi\sigma_x\sigma_y)\exp(h_{mn}(x, y))$$ [Equation 1]
$$h_{mn}(x, y) = ((x\cos\theta_n + y\sin\theta_n)^2/a^{2m}\sigma_x^2 + (-x\sin\theta_n + y\cos\theta_n)^2/a^{2m}\sigma_y^2)/2 - i2\pi W(x\cos\theta_n + y\sin\theta_n)/a^m$$

Here, (x, y) represents the position in the image, a represents a scaling factor, $\theta_n$ represents a filter direction component, and W represents a basic space frequency. Furthermore, σx, σy represent parameters giving the sizes spread in x and y directions of a filter function.

As the wavelet, this filter set has a mutually analogous function shape, and the function shapes differ from each other in main direction and size. This wavelet is known as a function whose shape is localized in a space frequency domain and a real space domain, whose simultaneous uncertainty concerning the position and space frequency is minimum, and which is most localized in both the real space and the frequency space.

In the present embodiment, $\theta_n$ takes six direction values of 0, 30, 60, 90, 120 and 150 degrees, a is set to 2, and m is set as an integer of 1 to 4. The parameters $\sigma_x$, $\sigma_y$ are preferably set so that in Fourier domain the filters appropriately and homogeneously overlap each other, and do not deviate to the specific space frequency. For example, when mesial magnitudes to an amplitude maximum value after Fourier conversion are designed to abut on each other in the Fourier domain, the following equations result:

$$\sigma_u = -(a-1)U_H/\{(a+1)(2\ln 2)^{1/2}\}$$ [Equation 2]

$$\sigma_v = \tan(\pi/2N)\{U_H^2 - (2\ln 2)\sigma_u^2\}/\{(2\ln 2)U_H^2 - (2\ln 2)^2\sigma_u^2\}^{1/2}$$ [Equation 3]

$$a \times (U_H/U_L) - 1(M-1)$$ [Equation 4]

Here, $U_H$, $U_L$ represent the maximum value and the minimum value of a space frequency band covered with the wavelet transformation, and M represents a scaling level number in the range.

The Gabor wavelet transformation is performed by performing a two-dimensional convolution operation of each filter $g_{mn}(x, y)$ and the input shaded image.

$$W_{mn}(x, y) = \int I(x_1, y_1) g_{mn}^*(x - x_1, y - y_1) dx_1 dy_1 \quad \text{[Equation 5]}$$
$$= A_{mn}(x, y) \exp\{i P_{mn}(x, y)\}$$

Here, I represents the input image, and $W_{mn}$ represents a Gabor wavelet transformation factor. The set of $W_{mn}$ (m=1, ..., 4; n=1, ..., 6) is used as a characteristic vector, and $W_{mn}(x, y)$ is obtained at each point. Additionally, * indicates that complex conjugate is taken. Mainly to reduce the operation amount, in an area growth processing based on a distance function value in the characteristic space between the standard point and the attention point described later, the following characteristic amount may be obtained from $W_{mn}$ and used.

For example, when the following is used as a texture energy, the average set degree of the space frequency in a constant range is represented:

$$T(x, y) = \sum_{m,n} |W_{mn}|^2(x, y)$$

Since this is a scholar amount, the operation amount during similarity comparison can remarkably be reduced.

Additionally, the set of the average value and dispersion value concerning each component in the neighborhood area of each standard point or attention point (e.g., when $\mu$mn, $\sigma$mn are set as the average value and the dispersion value in the neighborhood of the standard point or the attention point, $[\mu_{11}, \sigma_{11}, \mu_{12}, \sigma_{12}, \ldots, \mu_{46}, \sigma_{46}]$) may be used as the characteristic vector. Moreover, as the texture characteristic amount is used $W_{mn}$ for the specific (m, n) which provides the maximum average value in the local area when the predetermined evaluation standard in the neighborhood area of the standard point, for example, the homogeneous degree in the local area is high, or which provides the maximum contrast in other case (when the difference of the maximum and minimum values are large and the frequency of each value is equal to or more than a constant level). Alternatively, a plurality of (about two or three) factors $W_{mn}$ are selectively extracted from the factors which provide the maximum value in order of the value, and the characteristic vector constituted of the factors and having a lowered dimension (e.g., $[|W_{m_1 n_1}|, |W_{m_2 n_2}|, |W_{m_3 n_3}|]$) may be used as the texture characteristic amount in the neighborhood of the standard point or the attention point. Furthermore, the distribution shape of the histogram defined in the following color component characteristic amount is obtained for each of the Gabor wavelet transformation factors in the neighborhood of the standard point and the attention point, and may be represented as the characteristic vector.

The characteristic amount extracted by the color component characteristic amount extraction apparatus 24 will be described. As the color components, the component values of RGB, or the components reduced to hue, chroma and lightness are used. Here, the histogram concerning each color component is formed in the neighborhood area given by a rectangular area of a predetermined size (e.g., ten vertical pixels, ten horizontal pixels) centering on the standard point (or the attention point), and the color component characteristic amount is obtained such as the characteristic amount given as a list of characteristic vectors based on the distribution shape for each standard point (or the attention point) or the representative values of the color component.

When the distribution shape of the histogram is represented as the characteristic vector, for example, the number of pixels having the corresponding color components is counted with respect to each range (hereinafter referred to as the bin) obtained by equally dividing a range of 0 to 255 by N (e.g., N=20) for each component value of RGB, and the frequency is obtained. The characteristic vector $V_R$, $V_G$, $V_L$ of the number of elements N is obtained with respect to the frequency of each color component. For example, $V_R = [V_1^R, V_2^R, \ldots, V_N^R]$ represents the distribution shape of the histogram for the R component.

The characteristic amounts by the representative component values of the color components are represented by the color component values apart from one another by a standard value of distance or more in a color space, for example, by the color component values forming the central values of the bins of the histogram. As a distance $D_C$ in the color space used herein, the following sum of absolute values of component differences is typically used:

$$D = |R(x,y) - R(x',y')| + |G(x,y) - G(x',y')| + |B(x,y) - B(x',y')|$$

Therefore, the list of representative colors in the neighborhood of the standard point is represented, such as $(R_1, G_1, B_1), (R_2, G_2, B_2), \ldots, (R_k, G_k, B_k)$.

Figure 5:
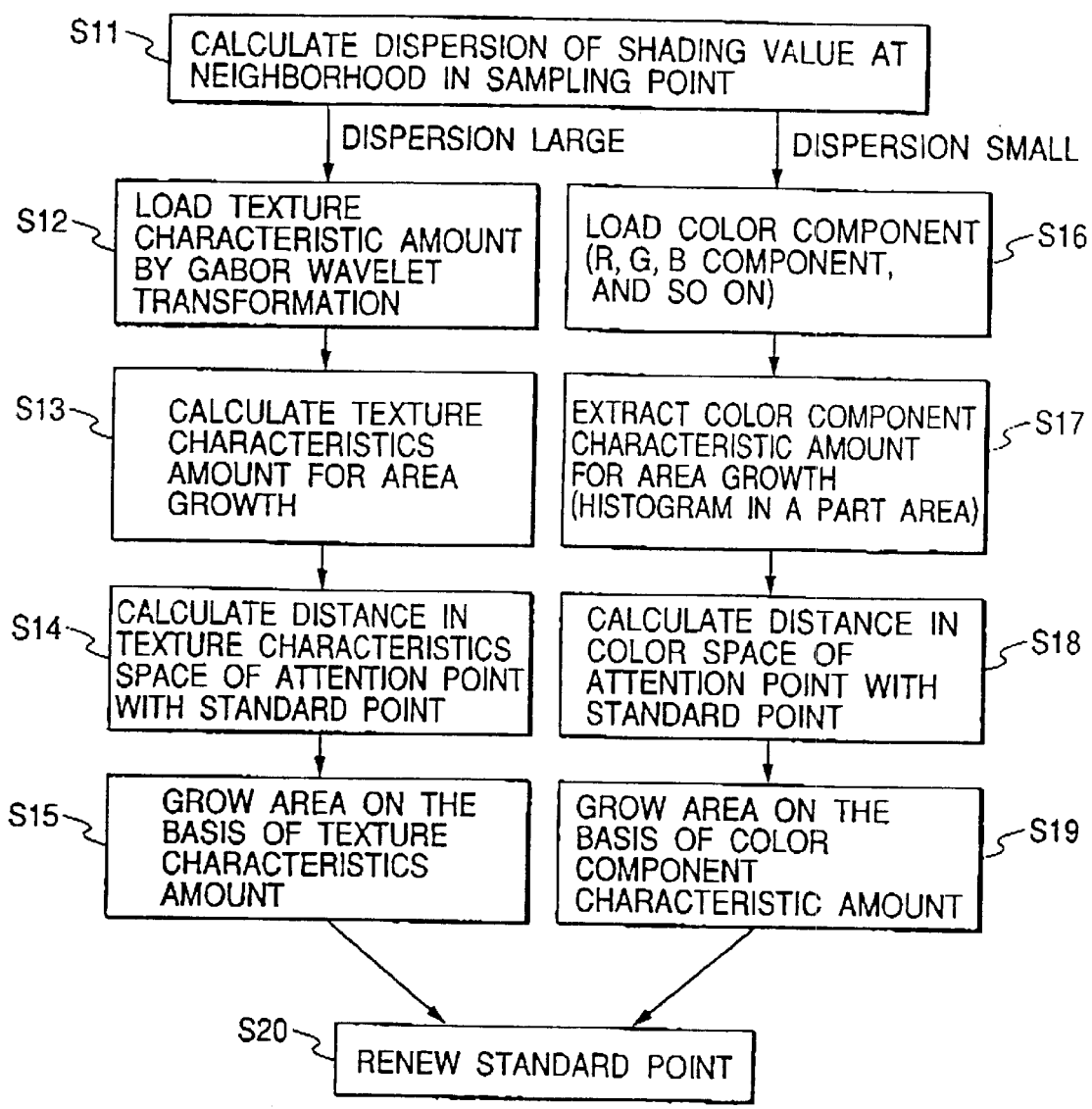
FIG. 5 is an operation flowchart showing a characteristic distance calculation by a characteristic amount distance calculation apparatus 26 and area growth by an area growing apparatus 28.

After the characteristic amount is extracted, the characteristic amount distance calculation apparatus 26 calculates a characteristic amount distance between the standard point and the attention point (S5). FIG. 5 is an operation flowchart showing characteristic distance calculation by the characteristic amount distance calculation apparatus 26 and area growth by the area growth apparatus 28. In the present embodiment, the dispersion of the shading value taking a value in a range of 0 to 255 in the neighborhood of the standard point is obtained. When the dispersion value is equal to or more than the threshold value (e.g., 30), it is determined that the image pattern has a texture dominant characteristic. When the value is less than the threshold value, it is determined that the change of the shading value is moderate (S11).

When the dispersion value is equal to or more than the threshold value (S11), the texture characteristic amount is loaded from a primary storage apparatus (not shown) (S12), the characteristic amount suitable for the area growth (e.g., texture energy) is calculated (S13), and a distance $D_T$ concerning the texture characteristic amount is obtained (S14). The characteristic amount conversion processing (S13) can be omitted depending on a processing speed, required precision, and the like. In this case, the texture characteristic amount is given as the set of the Gabor wavelet transformation factors.

When the dispersion value is less than the threshold value (S11), the color component characteristic amount is loaded from the primary storage apparatus (not shown) (S16), the characteristic amount suitable for the area growth (e.g., the list of the characteristic vectors obtained from the local histogram concerning the color components or the representative color components) is extracted (S17), and a distance $D_C$ concerning the color component is obtained (S18). The characteristic amount conversion processing (S17) can be omitted depending on the processing speed, required precision, and the like. In this case, the color component characteristic amount is given as the RGB component values.

In the determination of S11, the dominant characteristic amount may be determined not only by the dispersion but also by other evaluation value scales. For the distance $D_T$ concerning the texture characteristic amount, when the texture characteristic amount is a scholar amount (e.g., the texture energy or the selected/extracted Gabor wavelet transformation factor value), the difference absolute values of the values in the standard point and attention point are preferably used. Similarly, when the texture characteristic amount is a vector amount, the sum of the difference absolute values among the corresponding components is preferably used. However, as the other scales of the characteristic amount distance, Euclidean distance, Minkowski distance, chi-square distance, Kolmogorov/Smilnov distance, and the like may be used.

The processing shown in FIG. 5 is one example, and the value shown in the following equation may be calculated by defining the distance as the weighted sum of first and second distances, and using the predetermined evaluation value γ concerning the superiority of the texture (or the color component) as a weighting factor:

$$D = D_C + \gamma D_T \quad \text{[Equation 7]}$$

For example, γ is set as follows:

$$\gamma = \beta(\alpha/\sigma(x, y) + \mu(x, y))$$

Then, the average value $\mu(x, y)$ of the texture characteristic amount is high in the local area cantering on the point (x, y). Additionally, when the homogeneous degree $1/\sigma(x, y)$ is high, the value of the factor γ increases. In the equation, α, β are constants.

Subsequently, the area growth apparatus 28 grows the area based on the characteristic amount distance, and renews the standard point position (S6). The area growth means a processing of combining the attention point with the extraction area including the standard point when the distance D between the standard point and the attention point in the characteristic space is equal to or less than the threshold value, or removing the attention point from the extraction area when the distance is greater than the threshold value. The borderline renewal apparatus 30 obtains the borderline data of the core obtained in the process of the area growth, and successively displays renewal results on the screen of the image display 14.

The processing of FIG. 5 comprises growing the area based the corresponding characteristic amount (S15, S19), and determining the renewal position based on a new borderline of the core area obtained by unifying the area growth results from the standard points (S20). Specifically, the renewal position of each standard point is given as the predetermined sampling point on the borderline of the new core area obtained by the area growth. In the area growth by the color component characteristic amount, when the characteristic amount by the representative component value of the color component is used, the renewal of the standard point position is not indispensable.

The standard point is appropriately sampled from the borderline of the new core area in the process of the area growth according to the predetermined method (e.g., so that the distance between the adjacent standard points along the borderline substantially becomes equal). Therefore, the number of standard points usually increases/decreases.

FIGS. 3D, 3E, 3F show the progress from FIGS. 3A, 3B, 3C. The hatched parts of FIGS. 3D, 3E, 3F show the areas of growth process. FIG. 3G shows the final result after the area growth. The growth area converges to the borderline of the object. In the examples of FIGS. 3A to 3G, the core is first set in the background part. Therefore, in any example, after the growth is completed, a donut-shaped area is obtained in which the extraction object area forms a hole.

In the present embodiment, the threshold value is changed in connection with the operation by the user, for example, so that while the user depresses a mouse left button, the threshold value is monotonously increased with time, and while a right button is depressed, the threshold value is monotonously decreased (S7). During this operation, the area growth result is displayed on the screen of the image display 14 by an outer part borderline of the core area (S8). Thereby, the image extraction in which the user's intention is reflected can be realized. As a method of changing the threshold value, effective is a system in which the function of time while the mouse button is depressed increases or decreases in a primary function manner, or a system in which, for example, a hyperbolic function tanh(x) increases or decreases so as to be saturated to the constant level. The latter system is effective and preferable when the upper limit or lower limit is to be predetermined.

Figure 6:
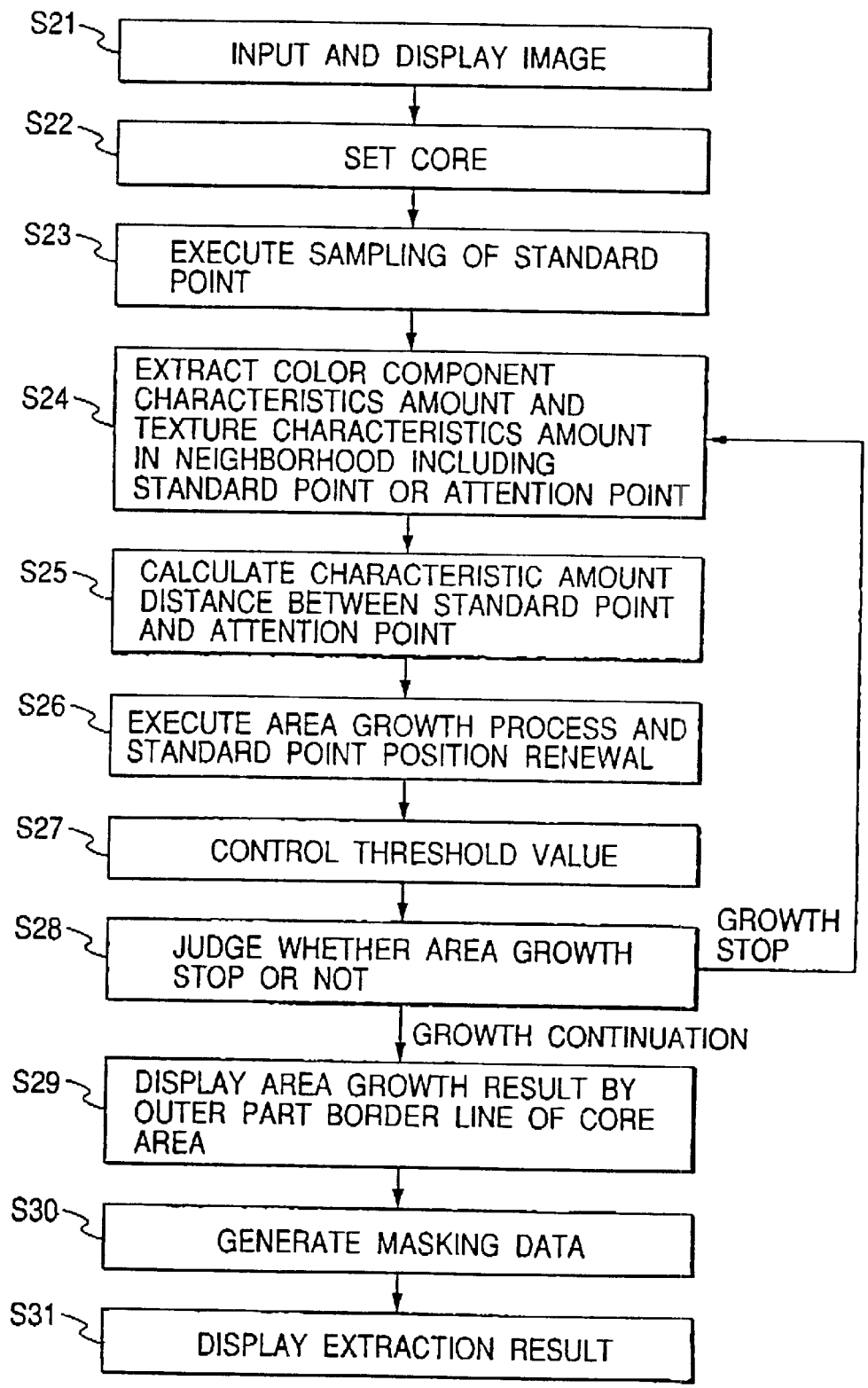
FIG. 6 is a flowchart showing a modification of FIG. 4 for automatic extraction.

In the present embodiment, the outline of the extraction object and the object image can automatically be extracted depending on the combination of the background and the pattern of the extraction object. FIG. 6 shows a modification of the flowchart of FIG. 4 for this purpose. The processing from the image input (S11) to the start of the area growth (S26) is the same as that of the flowchart shown in FIG. 4. However, here, the area growth is executed from the core constituted of all or some of input image frames (or the core set by the user) according to the predetermined initial threshold value, the edge ratio of the point on the borderline of the core area renewed by the area growth is calculated as (one example of) the evaluation value to judge the appropriateness of the growth result, and the area growth threshold value is controlled based on the calculated value (S27). Specifically, for example, when the edge ratio is less than the predetermined threshold value $Th_E$ (e.g., 0.5), the threshold value is monotonously increased every processing cycle or every unit time of the area growth with the predetermined ratio. When the ratio is equal to or more than $Th_E$, the threshold value for the area growth is given in accordance with the monotonous increase function (e.g., hyperbolic function tanh) which successively reaches the predetermined saturation level.

In this case, when the initially set core is a closed curve surrounding the extraction object, the inner borderline of the donut-shaped area obtained as a result of the area growth is an edge ratio calculation object. When all the initially set cores are present inside the extraction object, needless to say, the outermost part borderline is the edge ratio calculation object. Additionally, when the initially set core is an isolated point in the neighborhood of the extraction object, a fragmentary line segment or an isolated small area, the appropriateness of the area growth result cannot always be judged only with the edge ratio, but in order to display the interim result, by automatically stopping the processing (S28), the borderline of the core area may be displayed (S29).

For the conditions of the processing discontinuation or automatic stop (S28), the processing is stopped when the edge ratio equals or exceeds the predetermined level (e.g., 90%), when the absolute value of a change rate equals or lowers the constant value (e.g., 10%), or the like. By using the indexes other than the edge ratio, such as a borderline length and a texture edge ratio, the processing stop may be determined. The texture edge is obtained by extracting the edge of the two-dimensional distribution data of the texture characteristic amount (texture energy, Gabor wavelet transformation factor value, or the like), and is obtained, for example, by performing a space differential operation on the data by Sobel filter or the like, and further performing a binarizing processing.

During the edge ratio calculation, when the borderline of the core obtained as a result of the area growth abuts on the image frame, it is preferable not to use the part as the object. Because it is considered that there is usually a few cases in which the outline of the extraction object agrees with the outline of the image frame.

When the user recognizes that the outline obtained by the area growth is incomplete, the processing is further continued, or the incomplete part can be repaired according to the following method procedure For example, the instruction selection apparatus 18 is used to designate/select the necessary part or the borderline of the appropriate part, and the part is decided (e.g., in a method of double clicking the mouse button, or a method of clicking an icon of confirmation button displayed on the screen of the image display 14). Thereby, the area growth processing is automatically continued further for the remaining part, or the area growth is executed in response to the user's instruction.

The outline extracted by the above-described method is the outline of the extraction object or the outline of the background area excluding the extraction object. When the outline forms the closed curve, the masking data generation apparatus 32 generates the masking data indicating the area inside the closed is curve (usually, binary data, each pixel inside the mask area is set to '1', and each outer pixel is set to '0') (S9, S30). The extraction image generation apparatus 34 obtains the logical product of the masking data and an original image to generate the image data indicating the extraction object image, and the extraction result image is displayed (S10, S31). For example, a display method of setting the area other than the extraction object in a specific color, or flashing/displaying the extracted outline is employed so that the user can easily visually confirm the extraction result.

In the present embodiment, the characteristic amount of the local space frequency domain obtained by the Gabor wavelet transformation is used as the texture characteristic amount, but this characteristic amount is not limited. For example, as described below, the other characteristic amount may be the characteristic amount not indicating the information such as the pixel value of a certain pixel and a simple density gradient (edge intensity), but indicating the image pattern characteristic in the local two-dimensional area (or a general area) (preferably the amount can be defined for each pixel). This can also apply to the following embodiments. For example, an energy obtained by a density cooccurrence matrix, entropy, correlation, local uniformity, and other characteristic amounts can be utilized.

It is evident that each above-described processing may be formed by a predetermined program format executable in a computer, or each component processing can be realized even in a mixed format of the hardware such as a predetermined gate array (FPGA, ASIC, and the like), or a predetermined computer program and a partial hardware module for realizing some of the elements shown in FIG. 1. When the hardware module is included, the constituting elements may not necessarily be the same as those shown in FIG. 1. It goes without saying that the constitution having substantially the same function, or one element provided with a plurality of element functions of FIG. 1 is included in the technical scope of the present invention. This respect also applies to the following embodiments.

Figure 7:
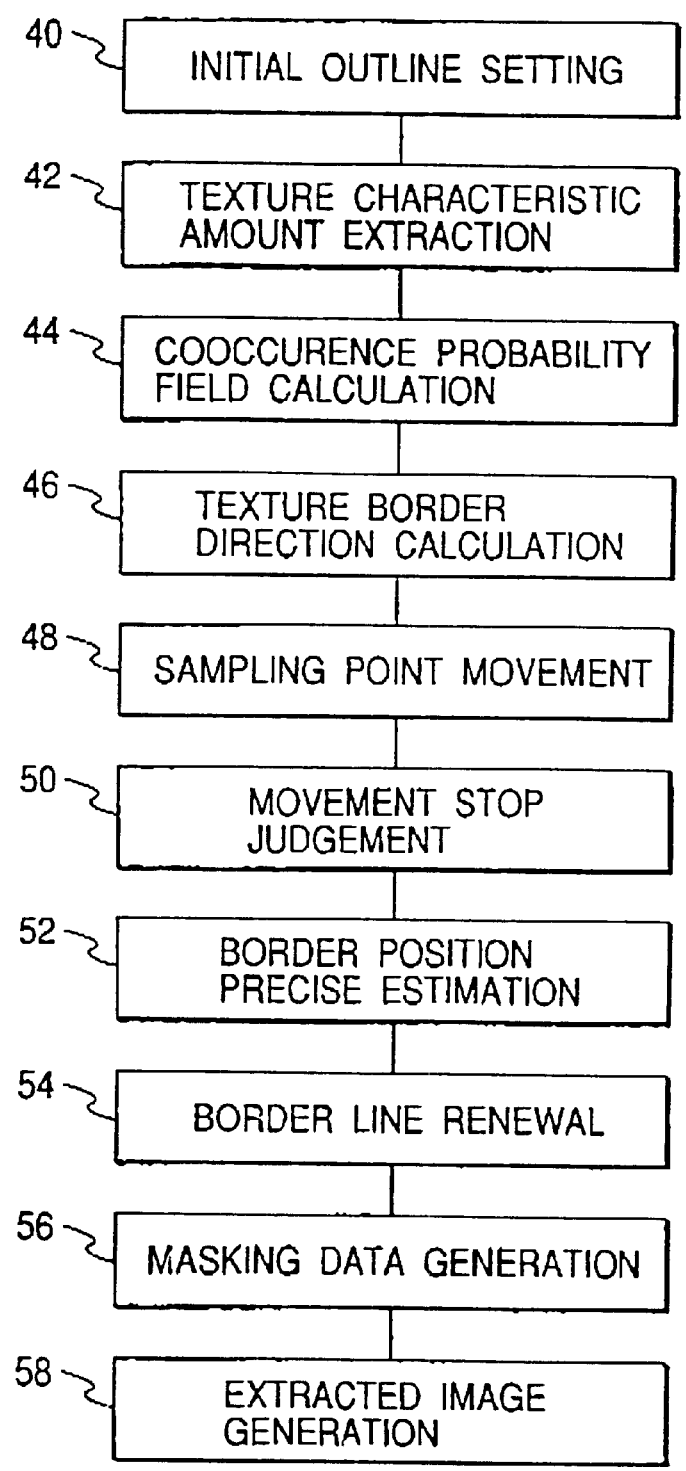
FIG. 7 is a schematic block diagram showing a second example of the image processing apparatus 16.

FIG. 7 is a schematic block diagram showing another constitution example of the image processing apparatus 16. Numeral 40 denotes an initial outline setting apparatus, 42 denotes a texture characteristic amount extraction apparatus, 44 denotes a cooccurrence probability field calculation apparatus for calculating a cooccurrence probability field based on the texture characteristic amount, 46 denotes a texture border direction calculation apparatus for calculating a texture border direction based on the cooccurrence probability field, 48 denotes a sampling point moving apparatus, 50 denotes a movement stop judging apparatus, 52 denotes a border position precisely estimating apparatus, 54 denotes a borderline renewal apparatus, 56 denotes a masking data generation apparatus, and 58 denotes an extracted image generation apparatus. FIG. 7 is the same as FIG. 2 in that the constitution is provided with the primary storage apparatus (not shown) for temporarily storing the in-process data.

Figure 8:
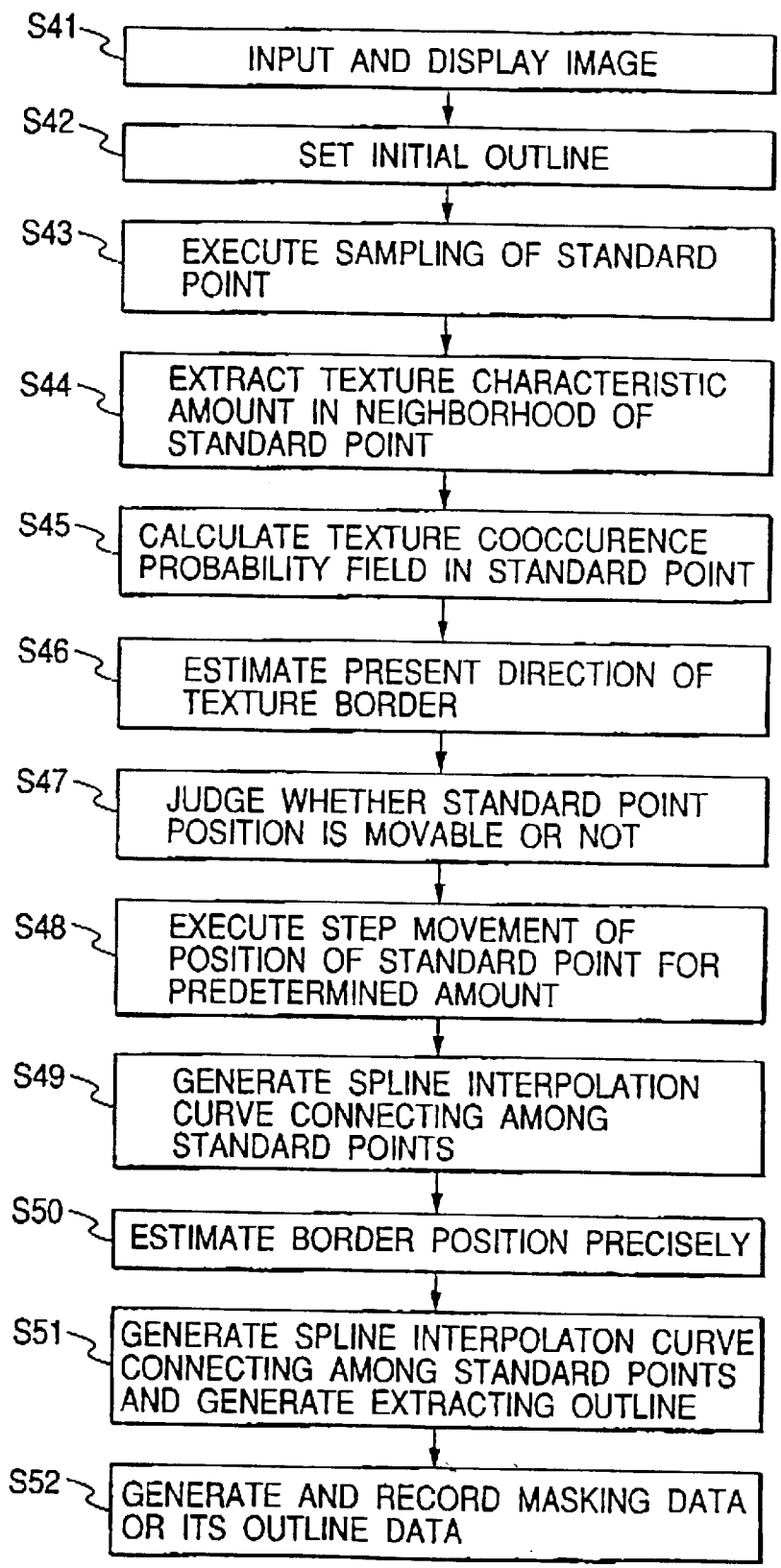
FIG. 8 is an operation flowchart of the image processing apparatus 16 shown in FIG. 7.

FIG. 8 is an operation flowchart of the constitution shown in FIG. 7. The processing example changes as shown in FIGS. 3B, 3E and 3G in order.

After the image is inputted and displayed (S41), the user uses the instruction selection apparatus 18 to set a closed curve (including a rectangular frame) surrounding the extraction object or a closed curve roughly indicating the shape of the extraction object inside the extraction object as the initial outline (S42). The initial outline is not limited to the closed curve, and the closed curve roughly surrounding the extraction object as shown in FIG. 3A may be used.

An outline image generation apparatus (not shown) superposes and displays the initial outline on the input image on the screen of the image display 14 in a specific color or pattern to facilitate the visual recognition. The standard point is sampled on the initial outline at a predetermined interval, for example, at an interval at which the distance along the outline is substantially constant between the adjacent points (S43).

Subsequently, in the same manner as the first embodiment, the shading value of the input image (when the input image data is a color image, the image is converted to a shaded image) is subjected to Gabor wavelet transformation, and the texture characteristic amount data is extracted in each point in the image by the conversion factor (S44). As the characteristic amount used herein, as described above, in addition to the texture energy, the characteristic vector constituted of the set of the average value and dispersion value of each component in the neighborhood area of each standard point or the attention point, $W_{mn}$ corresponding to the specific (m, n) which provides the maximum predetermined evaluation standard value in the neighborhood area of the standard point, the characteristic vector constituted by a plurality of $W_{mn}$ extracted in order of the absolute value and with the lowered dimension, and the like are used.

In each standard point, with respect to the texture characteristic amount of the local area including the point, a texture cooccurrence probability field H (x, y, D, θ) as defined below is obtained (S45). The texture cooccurrence probability field H (x, y, D, θ) is a probability with which two points having a relation of $|i-j|>Th$ are present when one (standard) characteristic amount is set to i, the other (comparison control) characteristic amount is set to j, and the threshold value as the standard of the size change amount of the texture characteristic amount changing in the vicinity of the borderline of the texture is set to Th, and is represented by the following equation:

$$H(x,y,D,\theta)=1/N_{(x,y) \in A} \Sigma\{|i-j|>Th, \ x_{i,a}-x_{j,b}=Dv_x(\theta)y_{i,a}-y_{j,b}=Dv_y(\theta)\}$$ [Equation 8]

Figures 9, 10:
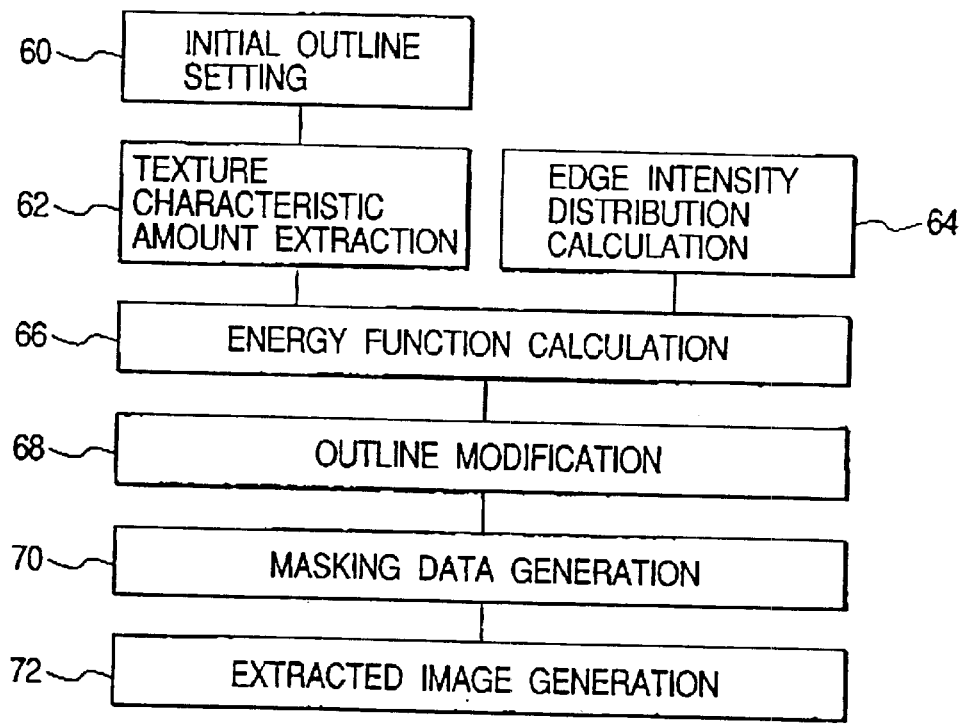
FIG. 9 is a table showing numerical value examples of Vx(θ), Vy(θ) In equation 8.
FIG. 10 is a schematic block diagram showing a third example of the image processing apparatus 16.

In this equation, $(x_a, y_a)$ represents the standard point in the arbitrary position in a local area A, and $(x_b, y_b)$ represents a comparison control point in the local area A. Symbol D represents the distance between two points in the local area including the point (x, y), θ represents the direction of the other point as seen from one point, and N represents the area (number of pixels) of the area A. Furthermore, $V_x(\theta)$, $V_y(\theta)$ are determined for each θ as shown in FIG. 9.

In the present embodiment, in order to estimate the present direction of the texture border, the above-described probability H is obtained only under a basic restrictive condition that the difference of the texture characteristic amount of two points is larger than the constant threshold value Th, and positive and negative directions θ are distinguished. The opposite direction to a specific direction is also distinguished.

On the other hand, in the cooccurrence matrix, only under a restrictive condition that the pixel apart from the pixel having a density value i by distance D in direction q has a density value j, the probability density of the presence of two points satisfying the condition is obtained. When the specific Gabor wavelet transformation factor (e.g., $W_{mn}(x, y)$) is used as the texture characteristic amount, the texture cooccurrence probability H is reread as $H_{mn}(x, y, D, q)$.

When the user instructs the start of the image extraction, it is instructed whether the initial outline converges to the outline of the extraction object basically by contraction, or expansion. In this case, as the basic movement direction of each standard point on the outline, the central direction of the outline is taken in the former case, and the direction toward the standard point from the center is taken in the latter case.

Based on the value of the texture cooccurrence probability H (x, y, D, θ), the estimated value θ(x, y) of the present direction of the texture border is obtained as θ such that the value in argmax is maximized as shown in the following equation (S46):

$$\theta(x, y) = argmax_\theta \{NH(x, y, D, \theta)P(x, y, D, \theta))P(x, y, D, \theta) = H(x, y, D, \theta)/(H(x, y, D, \theta) + H(x, y, D, \theta + \pi))$$ [Equation 9]

In the equation, NH(x, y, D, θ) represents the number of pairs satisfying the condition of the presence of the texture border, and P(x, y, D, θ) represents the probability indicating the superiority of the direction θ to θ+π as the present direction of the texture border.

In the equation 9, instead of setting the texture characteristic amount as the specific scholar amount (texture energy, and the like) shown in the first embodiment, the texture cooccurrence probability H is obtained for each Gabor wavelet transformation factor before calculating θ. Furthermore, the range of the value of distance D may be changed. In this case, H is obtained for each value of D, and the direction θ corresponding to the specific Gabor transformation factor $W_{mn}(x, y)$ which provides the maximum value of product NH(x, y, D, θ)P(x, y, D, θ) is obtained.

When the texture cooccurrence probability is zero, for example, when two points satisfying the calculation condition are not present in the local area in the neighborhood of the standard point, the central direction of the initial outline may be selected as θ.

Subsequently, it is judged whether the standard point position can be moved (S47). For the conditions for determining the movement stop, for example, when the estimated texture border direction is contradictory to the above-descrlbed basic movement direction (the convergent direction of the initial outline when the initial outline is set to surround the extraction object, or the expansion direction when the initial outline is set inside the extraction object) (e.g., different by 180 degrees or more), and/or when the change width and dispersion of the texture characteristic amount in the neighborhood area (10×10 rectangular area, and the like) of the standard point position are larger than the standard value, or when the previous movement direction is largely different from a new movement direction estimated after the movement (e.g., different by 180 degrees or more), the standard point is stopped in the position before the movement instead of moving the corresponding standard point.

When the movement can be performed, the step movement of the position of the standard point in the selected movement direction θ for a predetermined amount is executed (S48), and in the moved standard point the estimation of the texture border direction based on the texture cooccurrence probability and the movement judging processing are repeated by the above-described method.

A curve smoothly connecting the standard points after the movement is generated as the outline for the extraction by spline interpolation with the predetermined number of degrees (three degrees or five degrees are typical), and displayed on the screen of the image display 14 (S49). As a spline function, B spline or the like is typically used, but the function is not limited to the specific function.

After the above-described series of processing is performed particularly after the convergence of the movement operation of the standard point, or after the above-described repeated processing is automatically performed the constant number of times, and further after the processing is repeated the predetermined number of times according to the instruction (mouse button operation, keyboard operation, and the like) from the user if necessary, the border position of the extraction object is precisely estimated (S50). In the present embodiment, since the movement operation of the standard point position is performed by the step movement, the estimation of the border position with a resolution equal to or less than the movement step amount is necessary, and this precise estimation is executed for this purpose. Specifically, in the neighborhood area of the constant range of the standard point position, the maximum position of the edge intensity or the position of the point whose distance defined in the color space with respect to the characteristic amount of the color component as described above is equal to or more than the predetermined threshold value from the standard point is obtained.

The spline interpolation is similarly performed among the standard points obtained precisely as described above, and the outline of the image extracting object is generated (S51). Furthermore, the incomplete part may be repaired in the same manner as described above before the extracting outline is finally decided. For example, the borderline of the necessary part or the appropriate part is designated/selected and decided by the instruction selection apparatus 18. Additionally, the above-described processing is automatically continued on the remaining part, or an outline tracing method of tracing the maximum value of the edge intensity may also be used.

Finally, the masking data of the object to be extracted or the background to be removed or the outline data is generated, and stored in the predetermined storage means, thereby ending the processing (S52).

In the same manner as described above, the processing based on the above-described texture characteristic amount in accordance with the value of the obtained dispersion of the image shading value in the neighborhood of each standard point, or the area growth processing based on the color component in the constitution shown in FIG. 2 may appropriately be selected and executed. When the latter is executed, the area growth in the neighborhood area of the standard point is easily performed by the constant threshold value. However, when the threshold value of the area growth is automatically set or the automatic stop determination is performed, the following is performed. Specifically, since the outline of the extraction object is obtained by either mode of the convergence and expansion of the initial outline, the central direction of the initial outline for the convergence, or the standard point direction as seen from the center of the initial outline for the expansion is used as a main growth direction, a constant angle range including the main growth direction is set as the area growth range, and the edge ratio of the borderline part of the grown area is obtained. Based on the edge ratio or its change rate, as shown in FIG. 2, the threshold value control or the area growth stop may be performed. After the area growth, the new standard point is set from the borderline of the grown area, or the borderline part in the main growth direction range after the growth is held as a part of the new borderline. In the former case, an appropriate position (such as a point present in the main growth direction) may be sampled and set from the borderline of the predetermined range including the main growth direction.

FIG. 10 is a schematic block diagram showing a third constitution example of the image processing apparatus 16. Numeral 60 denotes an initial outline setting apparatus, 62 denotes a texture characteristic amount extraction apparatus, 64 denotes an edge intensity distribution calculation apparatus, 66 denotes an energy function calculation apparatus for calculating the energy function based on the texture characteristic amount and the edge intensity distribution of the input image, 68 denotes an outline modification apparatus for modifying the outline based on the calculated energy function, 70 denotes a masking data generation apparatus, and 72 denotes an extracted image generation apparatus for generating an extracted image data. In the same manner as in the above-described example, the constitution is provided with the primary storage apparatus for temporarily storing the in-process data.

The operation of the constitution shown in FIG. 10 will be described. Here, the object image is extracted by an active outline method of converging to a texture edge position concerning the characteristic amount in the texture characteristic space. Here, the texture edge is extracted as an edge at which the value steeply changes with respect to the two-dimensional distribution data of the predetermined texture characteristic amount. The texture edge is obtained, for example, by performing the space differential operation on the texture characteristic amount distribution data by the Sobel filter or the like, and further performing the binarizing processing.

The active outline method is a method of extracting an object outline from edge information by modifying an outline model so that the predetermined energy function indicating the restrictive condition that the outline be smooth and present on the edge is minimized, to converge to the outline on the object. As a developed method, proposed is a method of exerting an inward or outward external force onto the point on the active outline based on a difference in characteristic amount of the image of the neighborhood area of the initial outline and the image concerning the local area of the object part.

Figure 11:
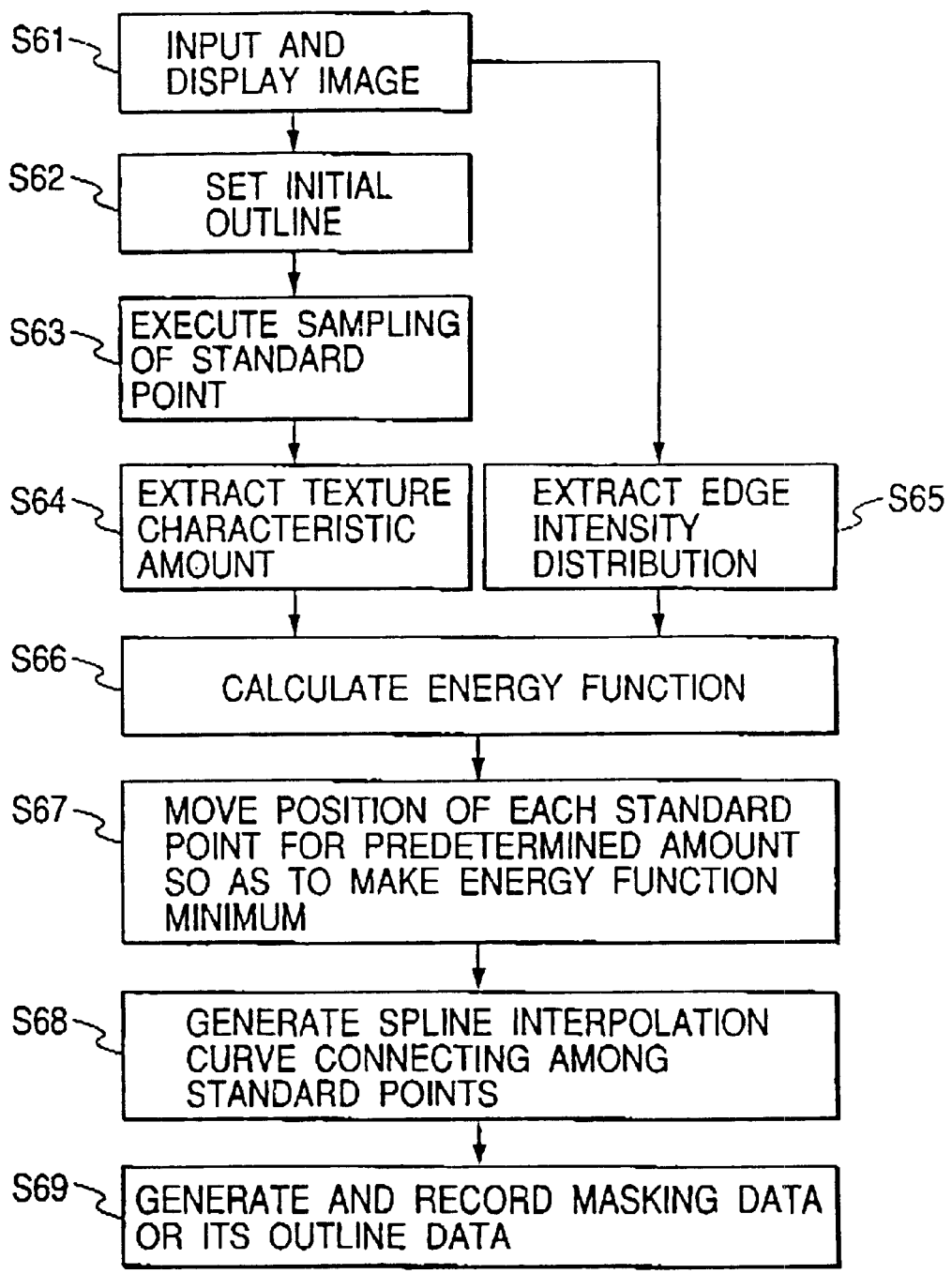
FIG. 11 is an operation flowchart of the image processing apparatus 16 shown in FIG. 10.

The operation of the constitution shown in FIG. 10 will be described with reference to the flowchart of FIG. 11. The processing example changes as shown In FIGS. 3B, 3E, 3G in order.

Since the processing of the image input till the standard point sampling (S61 to S63) is the same as that of S41 to S43 of FIG. 8, the description is omitted. The texture characteristic amount and the edge intensity distribution are extracted as the characteristic amounts (S64, S65), and the energy function is calculated from both the amounts (S66).

This embodiment is different from the above-described embodiments and the conventional example in that the term concerning the texture characteristic amount exists in the energy function. The energy function is concretely defined as follows. The energy function calculation apparatus 66 calculates an evaluation function value E in each standard point position $v(s_i)$ as follows:

$$E = \Sigma\{E_{int}(v(S_i)) + E_{image}(v(s_i)) + E_{texture}(v(s_i)) + E_{ext}(v(s_i))\} \quad \text{[Equation 10]}$$

Here, the terms of $E_{int}$, $E_{image}$ also exist in the conventional active outline method, and the other terms are newly introduced here. Moreover, $s_i$ represents the value of a peripheral length along the outline corresponding to an i-th sampling point position on the outline. Furthermore, $E_{int}$ represents an internal energy with which the outline model $v(s)=(x(s), y(s))$ intends to become smooth, and is given by the following equation:

$$E_{int}(v(s)) = \alpha(s)|dv/ds|^2 + \beta(s)|d^2v/ds^2| \quad \text{[Equation 11]}$$

Additionally, $E_{image}$ represents an energy indicating a force attracted to a so-called shaded edge, and is obtained using the calculation result of the edge intensity distribution calculation apparatus 64 as follows:

$$E_{image}(v(s)) = -W_I|\nabla I(v(s))|^2 \quad \text{[Equation 12]}$$

Similarly, $E_{texture}$ represents an energy indicating a force attracted to the texture edge, and is given by the following equation:

$$E_{texture}(v(s)) = -W_T|\nabla T(v(s))|^2 \quad \text{[Equation 13]}$$

In the equations 12 and 13, $I(v(s))$ and $T(v(s))$ represent the pixel value and the texture characteristic amount on $v(s)$, respectively. In the equation 11, $\alpha(s)$, $\beta(s)$ have to be set for each place in accordance with the shape of the outline, but may be constants. Furthermore, $W_T$ or $W_I$ is a constant determined when weight is placed on the texture edge or the shaded edge.

Moreover, $E_{ext}(v(s))$ corresponds to an external force, is appropriately set, and is herein as follows:

$$E_{ext}(v(s)) = -\gamma\{1nP_{in,z}(T(v(s))) - 1nP_{out,z}(T(v(s)))\} \quad \text{[Equation 14]}$$

In the equation, $\gamma$ is a positive constant, and $P_{in}(T(v(s)))$, $P_{out}(T(v(s)))$ are represented using the average values of the texture characteristic amounts $\mu_{in,Ns}$, $\mu_{out,Ns}$ and dispersion $\sigma_{in,Nz}$, $\sigma_{out,Nz}$ in the inner neighborhood area and the outer neighborhood area with respect to the initial outline or the renewed outline as follows:

$$P_{in,s} = (1/\{(2\pi)^{1/2}\sigma_{in,Ns}\})\exp\{-T(v(s))-\mu_{in,Ns}\}^2/(2\sigma^2_{in,Ns})\}$$

$$P_{out,s} = (1/\{(2\pi)^{1/2}\sigma_{out,Ns}\})\exp\{-T(v(s)) - \mu_{out,Ns}\}^2/(2\sigma^2_{out,Ns})\} \quad \text{[Equation 15]}$$

In the equation, Ns represents the neighborhood area in which the average value and dispersion of the texture characteristic amount are obtained with respect to the point $v(s)$. The area closer to the gravity center of the initial outline is regarded as the inner area, and the area far therefrom is regarded as the outer area.

By the application of the equation 15, the equation 14 means that when there is a high possibility that the sampling point on the outline Is present on the image of the inner neighborhood area of the initial (or renewed) outline, an expanding external force acts outwardly on the outline. Conversely, when there is a high probability that the point is present on the image of the outer neighborhood area, a contracting direction external force acts inwardly. Moreover, the equation 15 can be regarded as a function for evaluating the difference between the texture characteristic amount in the sampling point v(s) on the outline and the texture characteristic amount in the inner or outer neighborhood area, and in the meaning, a scale for evaluating the difference of another characteristic amount concerning the sampling point and the neighborhood area may be used. In the equation 15, the probability model of Gaussian is used, but other models may be used. In $E_{ext}(v(s))$, the equation 15 may be evaluated with respect to the image data I instead of the texture characteristic amount T. Furthermore, another component term may be added as the external force.

When the texture characteristic amount entirely covers the Gabor wavelet transformation factor $W_{mn}$ described with reference to FIG. 2, the weighting sum with respect to each component is defined as follows:

$$E_{texture}(v(s)) = -\mu \int \sum_n \sum_m \alpha_m \left[ \left| \frac{\delta}{\delta x} W_{mn}(v(s)) \right|^p + \left| \frac{\delta}{\delta y} W_{mn}(v(s)) \right|^p \right] ds \quad \text{[Equation 16]}$$

$$\alpha_{mn} = \frac{|W_{mn}|}{\sum_{j,n} |W_{jn}|}$$

Here, p represents a positive constant, and $\alpha_{mn}$ may be a constant irrespective of the definition of the above equation.

In the constitution shown in FIG. 10, the outline modification apparatus 66 successively moves the sampling point on the initial outline until the energy function value defined as described above converges to the minimum value (S67), and the curve smoothly connecting the points after the movement is generated by the spline interpolation (S68). Thereby, the outline of the object to be extracted is automatically obtained. The movement amount of each sampling point is obtained by calculus of variation which is already known in the active outline method.

The obtained outline is superposed on the input image on the display screen, displayed to be easily visually recognized, and repaired as occasion demands. Thereafter, the masking data generation apparatus 70 generates the outline data, extracted image data or masking data indicating the area, and the extracted image generation apparatus 72 stores the extracted image data to a recording medium or a storage apparatus (S72).

In the process of convergence of the initial outline to the extraction object, the relative weight of the energy term concerning the shading value (or the color component value) of the image and the term concerning the texture characteristic amount is preferably determined based on the evaluation result of the superiority of the texture characteristic based on the dispersion of the shading value in the vicinity of the sampling point as described with reference to FIG. 2. Specifically, weighting is performed as given by γ of the equation 7.

As easily understood from the above description, according to the present invention, after giving a considerably rough instruction concerning the extraction object or non-extraction object (the designation by the point, the designation by the approximate outline or the rectangular frame), the color component (or shading value) characteristic amount and the texture characteristic amount are used, or at least the texture characteristic amount is used to give an appropriate evaluation function in accordance with the local characteristic of the image pattern (e.g., the superiority of the texture characteristic component, or the possibility of the presence of the texture border), and the borderline of the extraction area is estimated based on the evaluation function value, so that the desired area can be extracted (image cut-out or outline extraction) with respect to a remarkably wide range of types of images with a simple operation. Moreover, the labor required for the instruction of the extraction object is minimized, and the collective extraction can be automated.

Figure 12:
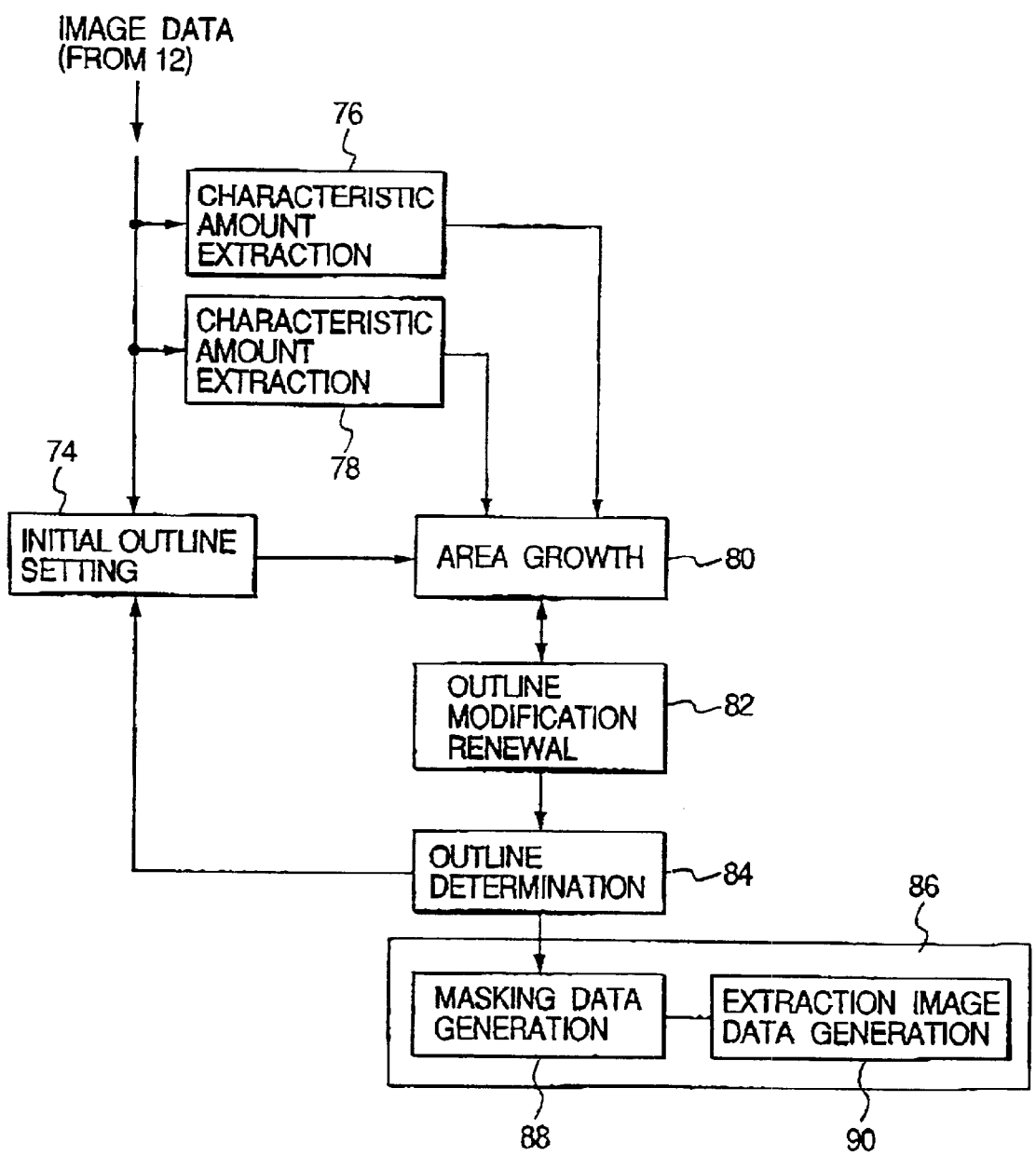
FIG. 12 is a schematic block diagram of the image processing apparatus 16.

FIG. 12 is a schematic block diagram showing another constitution example of the image processing apparatus 16. Numeral 74 denotes an initial outline setting apparatus, 76, 78 denote characteristic amount extraction apparatus, 80 denotes an area growth apparatus, 82 denotes an outline modification renewal apparatus, 84 denotes an outline determination apparatus, and 86 denotes a processing result output apparatus. The processing result output apparatus 86 is provided with a masking data generation apparatus 88 and an extracted image data generation apparatus 90. Some or all of these functions of the image processing apparatus 16 are actually realized by program software. The image processing apparatus 16 is provided with a storage apparatus (not shown) for temporarily storing the in-process data.

Figure 14A:
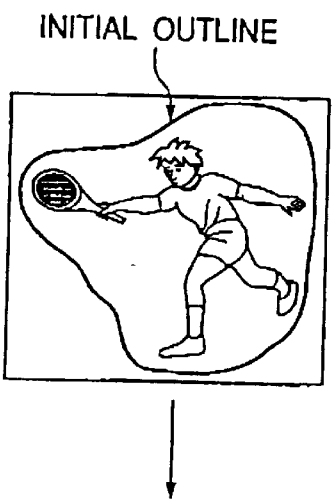
FIGS. 14A, 14B, 14C, 14D, 14E, 14F and 14G are schematic views showing the progress of the processing is by the present embodiment.
Figure 14B:
Figure 14C:
Figure 14D:
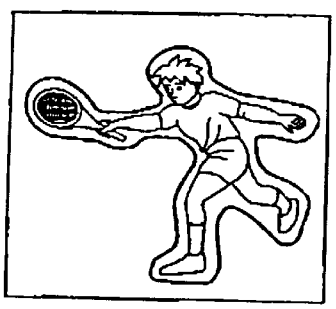
Figure 14E:
Figure 14F:
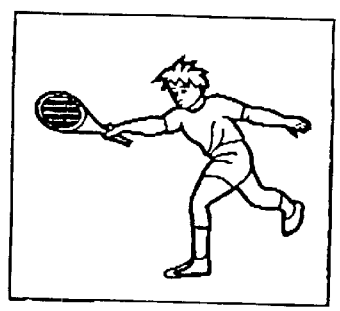
Figure 14G:

FIG. 13 is an operation flowchart of the image processing apparatus 16, and FIGS. 14A to 14G show a processing example. The image data is inputted to the image storage apparatus 12 from the image input apparatus 10, and displayed on the screen of the image display 14 (S70). The user looks at the displayed input image, and sets the closed or substantially closed initial outline having an arbitrary shape substantially along the shape of the area inside or outside the area to be extracted by the instruction selection apparatus 18 (S71). FIGS. 14A, 14B show an example of setting the initial outline outside the object area, and FIG. 14C shows an example of setting the initial outline inside the object area. FIG. 14B shows an example of most easily setting the outer part borderline of the image as the initial outline.

Specifically, when the position of the cursor (not shown) displayed on the image display 14 is decided, the button of the instruction selection apparatus (mouse) 18 is pushed, and the cursor is moved on the screen so as to draw a target curve locus, the initial outline setting apparatus 74 generates a smooth curve which connects sampling points obtained by sampling the points on the locus at the predetermined interval. This forms the initial outline. Additionally, when the mouse is clicked at a plurality of arbitrary points outside the extraction object, the initial outline setting apparatus 74 connects the clicked points with the straight line to generate the initial outline. By designating two points forming a diagonal, a rectangular initial outline may be generated.

The characteristic amount extraction apparatus 76 extracts the color component value of each pixel (RGB component values, or component values such as a hue (H), chroma (S) and lightness (V)) as a first characteristic amount from the input image (S72), and the characteristic amount extraction apparatus 78 extracts the edge intensity value in each pixel concerning the density (lightness) of the input image as a second characteristic amount (S73). In the edge intensity extraction, a filter processing is used with a space differential operation typically of Sobel, Prewitt and Canny filters. Furthermore, for the edge ratio calculation described later, the edge intensity is binarized with the predetermined threshold value. The first characteristic amount is used in the area growth processing described below, and the second characteristic amount is used for convergence discrimination of the modified outline.

The area growth apparatus 80 samples the representative points on the outline, and sets the neighborhood area of each representative point $(q_1, q_2, \ldots q_n)$ (S74). The neighborhood areas of the representative points are set to abut on one another or overlap by a constant width or more.

Figure 15:
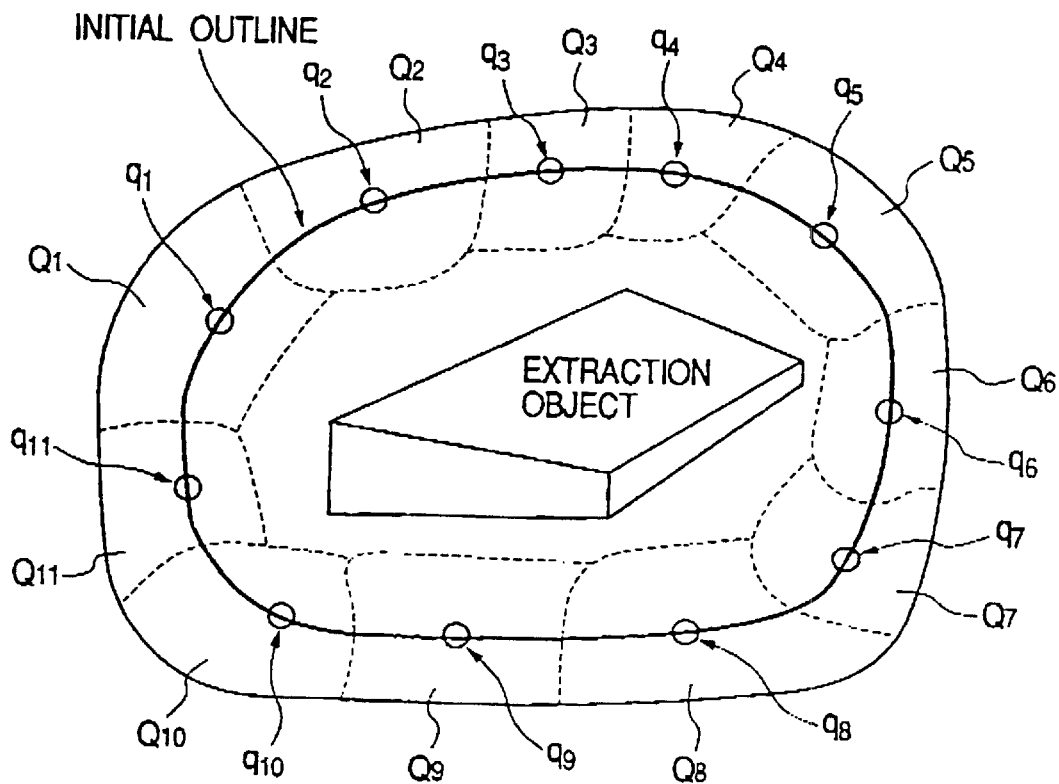
FIG. 15 shows an arrangement example of an initial outline.

A difference of the first characteristic amount in each representative point (e.g., $R_0$, $G_0$ and $B_0$) and the first characteristic amount with respect to each point in the neighborhood area (Rij, Gij, Bij) is obtained, and combined as the extraction area or the background area when the value is equal to or less than the threshold value (S75). This is the area growth. FIG. 15 shows grown areas ($Q_1, Q_2, \ldots Q_n$) for the representative points obtained as a result of the area growth so that the areas do not overlap one another for the sake of convenience. The borderline between the areas is shown by a broken line. Generally, the overlapping of areas occurs, but since one connected area is selected as the sum of the areas, no practical problem occurs.

In the area growth processing, typically the area obtained by combining the neighborhood areas of the representative points satisfying the following forms the background area or the extraction area after the area growth.

$$|Rij-R_0|+|Gij-G_0|+|Bij-B_0| \leq Th \quad \text{[Equation 17]}$$

As the scale indicating the difference of the characteristic amount, in addition to the left side of the equation 1, Euclidean distance, Minkowski distance, and the like may be used. In the equation 17, Th represents a threshold value. When un-convergence is determined as the convergence discrimination result described later, the threshold value is automatically increased by a predetermined amount. This basically applies also when the characteristic amount such as HSV is used as the color component.

The texture characteristic amount may be used in the first characteristic amount, and the texture edge intensity described later may be used in the second characteristic amount. In this case, in the following description, the point with the texture energy intensity equal to or more than a predetermined level is used as the edge, and the ratio of the number of edge points to the number of points with the total peripheral length is used as the edge ratio.

For example, the texture characteristic amount is constituted of a characteristic vector including Gabor wavelet transformation factor, as an element, obtained by convolution operation of Gabor filter having mutually different predetermined direction components and scaling factors and the shading distribution of the input image (corresponding to a so-called lightness distribution), or a characteristic vector including the average value and dispersion value of Gabor wavelet transformation factors as elements. Used is Gabor wavelet which has six directions, for example, at intervals of 30 degrees (0 degree, 30 degrees, ..., and 150 degrees), and three-stage scaling levels (1, 1/2 and 1/4).

Moreover, as the texture edge intensity $E_{TS}(x, y)$ to the specific direction $\theta$ used is a value which Is obtained as the weighted sum concerning the magnitude of the convolution component of each edge component of a characteristic vector field ($m_1(x, y), m_2(x, y), \ldots, m_N(x, y)$) and the primary differential of Gaussian function to the predetermined direction $\theta$ of the edge component.

$$E_\tau(x, y, \theta) = \Sigma w_i |m_i(x, y) \otimes \{-(x'/\sigma^2)G\sigma(x'_\theta, y'_\theta)\}| \quad \text{[Equation 18]}$$

$$1 \leq i \leq N$$

$\otimes$: convolution operation

In the equation, $x'_\sigma = x \cos \theta + y \sin \theta$ $'_\sigma = -x \sin \theta + y \cos t\theta$ Furthermore, $w_i$ represents a weighting factor, $G_o(x, y)$ represents Gaussian function of a standard deviation $\sigma$, and N represents the number of Gabor filters.

The weighting factor $w_i$ may be obtained, for example, by normalizing the value of the characteristic vector component $m_i$ with the entire magnitude of the characteristic vector:

$$w_i = \frac{m_i}{\sqrt{\sum_i m_i^2}} \quad \text{[Equation 19]}$$

The factor may also be obtained by normalizing the local average value of the characteristic vector component $m_i$ with the local average value of the entire magnitude of the characteristic vector:

$$w_i(x, y) = \frac{\sum_{a,b \in N(x,y)} m_i(a, b)}{\sqrt{\sum_{a,b \in N(x,y)} \sum_i m_i^2(a, b)}} \quad \text{[Equation 20]}$$

The factor may also be obtained by normalizing the characteristic vector component with its local entire energy:

$$w_i(x, y) = \frac{m_i}{\sqrt{\sum_{a,b \in N(x,y)} m_i^2(a, b)}} \quad \text{[Equation 21]}$$

Alternatively, uniform weighting ($w_i=1$) may be performed. Moreover, $N(x, y)$ represents the set of the points of the neighborhood area of point (x, y), and $w_i(x, y)$ represents the weighting factor in the point (x, y).

Figure 16:
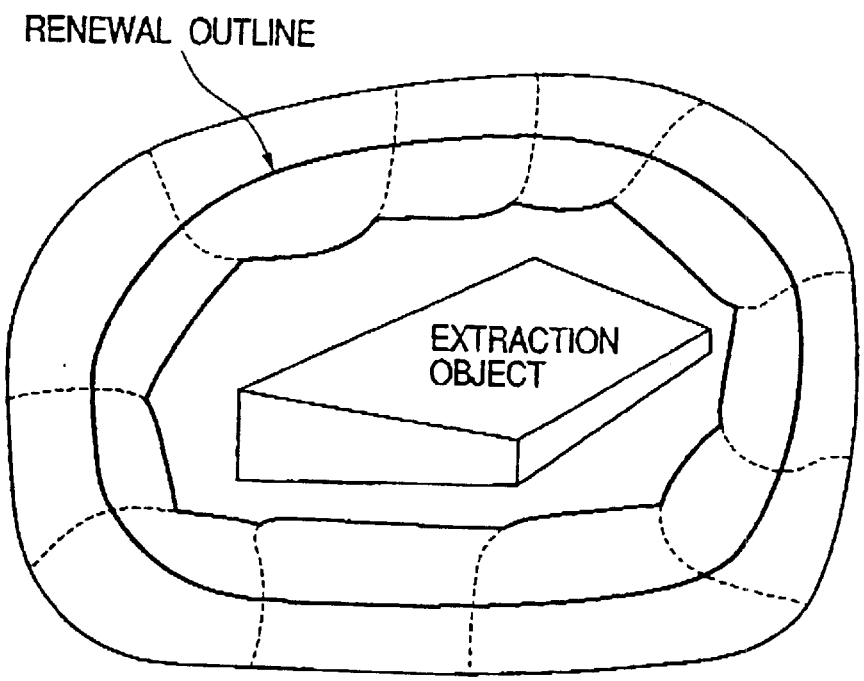
FIG. 16 shows an arrangement example of a renewed outline.

The outline modification renewal apparatus 82 extracts the outline based on the area growth result with the predetermined threshold value (S76). Specifically, when the outline is inside the extraction object, the outermost outline of the area after the growth is selected. When the outline is inside the background area, the innermost outline (having the predetermined length, for example, the peripheral length equal to or more than the half of the initial outline length) of the area after the growth is selected. FIG. 16 shows a renewed outline with respect to the initial outline shown in FIG. 15. In the latter case, the inner outline is taken as the outline of the object shape, because the area in the process of the area growth forms a connected area in which the area including the object area is formed as a hole. When the initial outline or the outline being modified is not closed, the outermost outline of the area after the growth is employed. The user instructs beforehand whether the initial outline is present inside or outside the extraction object.

After the renewal of the outline, the area growth apparatus 80 obtains the edge ratio of the outline (the present ratio of the edge point with the edge intensity equal to or more than the predetermined level among the points on the outline) (S77), and convergence discrimination is performed (S78). The edge ratio is a scale for measuring the convergence degree of the outline to the outline of the extraction object. When the edge ratio is higher than the threshold value (e.g., 0.8) for the convergence discrimination, the convergence is determined. By using the change rate of the edge ratio as the scale for the convergence discrimination, when the value is equal to or less than the predetermined threshold value (e.g., 0.1), the convergence may be determined.

Figure 17A:
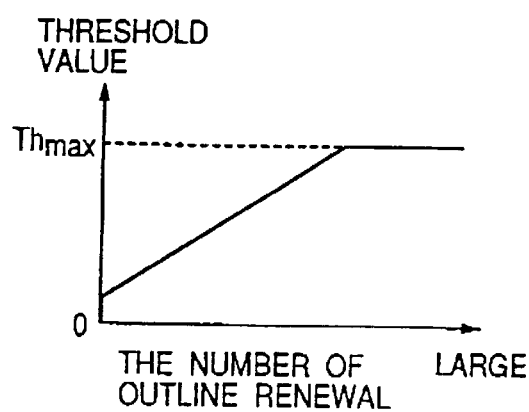
FIGS. 17A, 17B, 17C and 17D are diagrams showing a renewing characteristic of a threshold value of area growth.
Figure 17B:
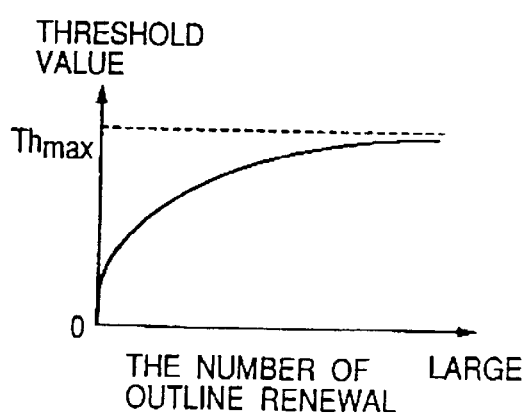
Figure 17C:
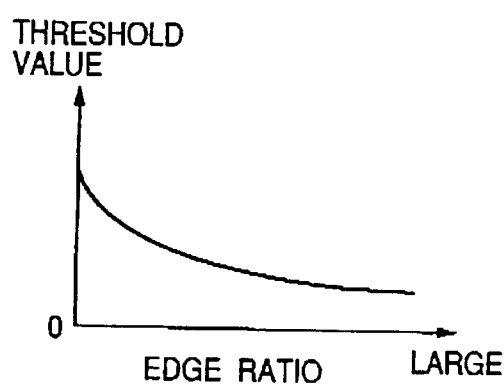
Figure 17D:
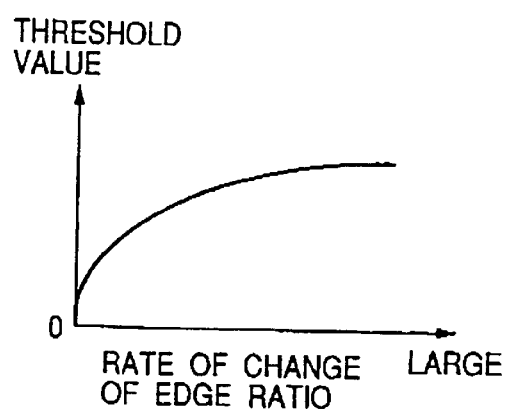

When the convergence discrimination result is un-convergence, the threshold value Th of the area growth is renewed (S79). FIGS. 17A to 17D show examples of a threshold value renewal characteristic. FIGS. 17A, 17B show an example in which the threshold value Th to the number of convergence discriminations is monotonously increased and saturated at the maximum value $Th_{max}$. FIG. 17C shows an example in which when the edge ratio on the renewed outline is lower than the predetermined level (e.g., 0.5), the increase of the threshold value This further increased based on the edge intensity as the second characteristic amount. When the ratio is higher than the predetermined level, the increase is reduced. FIG. 17D shows an example in which when the rate of change of the edge ratio decreases, the increase rate of the threshold value Th is relatively reduced. Any of the constitutions may be employed. Moreover, other parameters for controlling the renewal characteristic, such as the outline length and the change rate of the outline length, may be used. The edge ratio approximately represents the convergence of the outline to the extracted object.

The outline determination apparatus 84 superposes and displays the outline after the convergence on the original image on the screen of the image display 14 (S80). When the interval of the outline having actually and correctly converged to the extraction object is instructed/selected by the user's operation (operation using the mouse or another instruction selection apparatus 18), the part (or the entire outline) is decided as the outline of the extraction object (S81).

The non-selected outline part is thereafter treated as an un-convergence part, and the modification renewal is performed by repeating the above-described processing, so that the part can converge to the extraction object. Specifically, the un-convergence outline is set to the initial outline (S82), and the above-described processing (S74 to S81) is again executed. However, for the renewal of the outline with respect to the area obtained as a result of the area growth centering on the un-convergence outline part, the new area including the un-convergence outline part before the area growth as the borderline is divided and cut out from the area after the growth, and the remaining borderline obtained by excluding the un-convergence outline part before the growth from the borderline of the area is set as the renewal outline.

The outline extracted in the above procedure is the outline of the extraction object, or the outline of the background area excluding the extraction object. When the outline forms the closed curve, the masking data indicating the area inside the closed curve (usually, binary data, each pixel inside the mask area is set to '1', and each outer pixel is set to '0') is generated (S83). The desired object image Is extracted by obtaining the logical product of the masking data and the original image. The extracted image is displayed on the screen of the image display 14 so that the image can easily visually recognized (e.g, by displaying the area other than the extraction object in the specific color, flashing-displaying the extracted outline, and the like) (S84).

In the present embodiment, the initial outline is set to a closed diagram, but a not-closed arbitrary line segment, curve element or point may be set to the element constituting the initial outline.

For the renewal characteristic of the area growth threshold value, without using the monotonous increase (decrease) of the edge ratio or the number of convergence discriminations, the renewal may be performed based on an arbitrary function determined by a plurality of elements such as the edge ratio and the change rate of the edge ratio. Furthermore, after the edge ratio reaches a constant level, the area growth processing is again performed on the un-convergence outline part. In this case, the area growth threshold value may be reset, and started from the initial value. The method of controlling the area growth threshold value is not limited to the above-described method, and other methods may be used.

It is evident that each above-described processing may be formed by a predetermined program format executable in the computer, or each component processing can be realized even in the mixed format of the hardware such as the predetermined gate array FPGA, ASIC, and the like), or the predetermined computer program and the partial hardware module for realizing some of the elements shown in FIG. 1. When the hardware module is included, the constituting elements may not necessarily be constituted in the same manner as in FIG. 1. It goes without saying that the constitution having substantially the same function, or one element provided with a plurality of element functions of FIG. 1 is included in the technical scope of the present invention. This respect also applies to the following embodiment.

An embodiment of automatically extracting a specific moving object image from animation will next be described. In this case, the image input apparatus is constituted, for example, of animation output apparatuses such as a video camera. In the input image, the background is stationary. Specifically, the image is not panned, tilted or zoomed.

Figure 18:
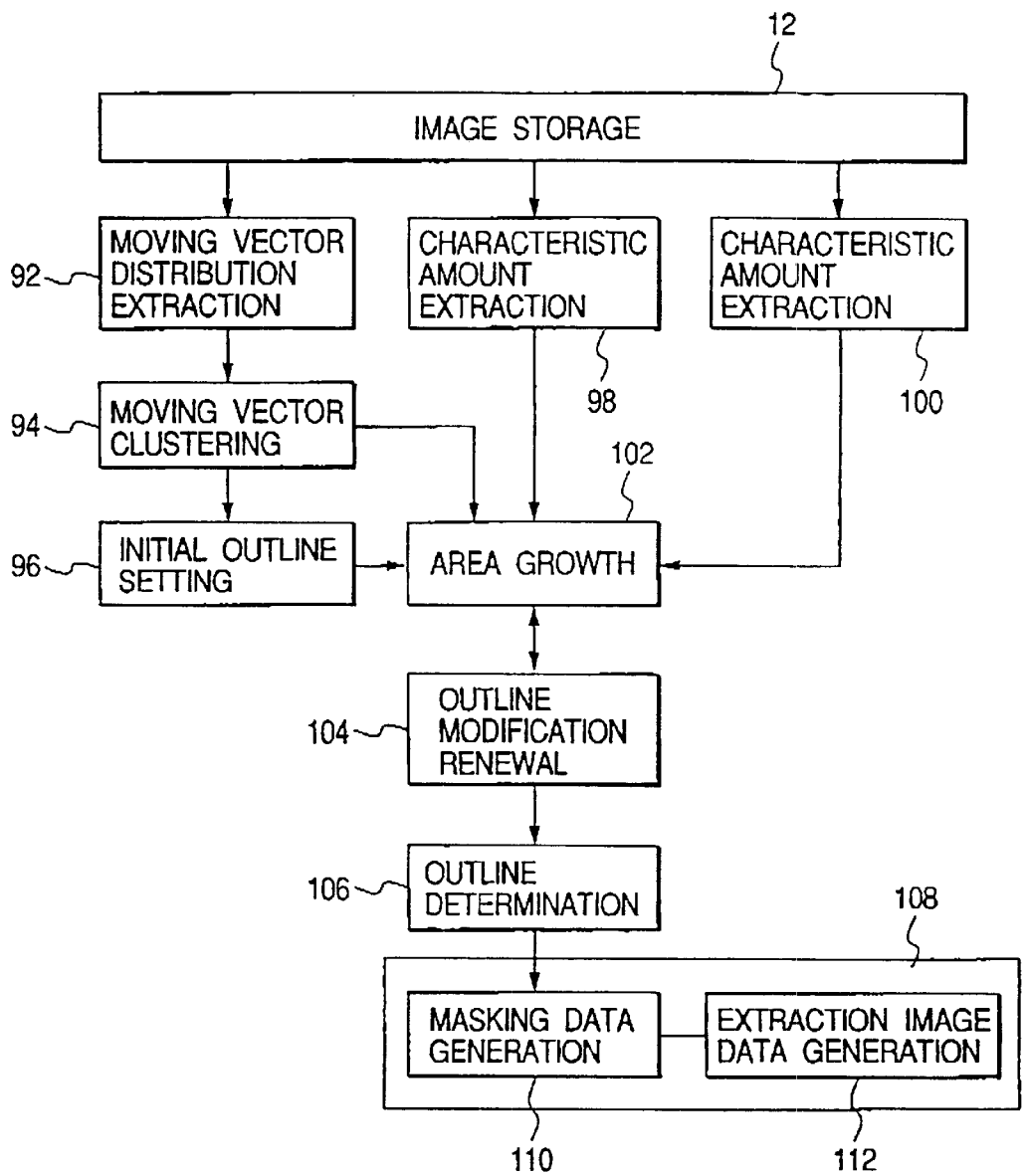
FIG. 18 is a schematic block diagram showing another constitution of the image processing apparatus 16.

FIG. 18 is a schematic block diagram of the image processing apparatus 16 of the animation. Numeral 92 denotes a moving vector distribution extraction apparatus, 94 denotes a moving vector clustering apparatus, 96 denotes an initial outline setting apparatus, 98, 100 denote characteristic amount extraction apparatus, 102 denotes an area growth apparatus, 104 denotes an outline modification renewal apparatus, 106 denotes an outline determination apparatus, and 108 denotes a processing result output apparatus. The processing result output apparatus 108 is provided with a masking data generation apparatus 110 and an extracted image data generation apparatus 112. Some or all of these functions are actually realized by program software. FIG. 18 is the same as FIG. 2 in that the image processing apparatus is provided with a storage apparatus (not shown) for temporarily storing the in-process data.

The moving vector distribution extraction apparatus 92 extracts a moving vector distribution by a gradient process of an inputted time series image, or a method of dividing each frame into blocks and extracting the corresponding point among frames by block matching. The moving vector clustering apparatus 94 connects the areas having the moving vector extracted by the moving vector distribution extraction apparatus 92, or a significant moving vector.

The initial outline setting apparatus 96 automatically sets the borderline of a polygon including (or included inside) the connected area obtained by clustering by the moving vector clustering apparatus 94 as the initial outline. For example, the polygon may be circumscribed (or inscribed) with the connected area, may have a distance of a constant value or more between each point on the borderline of the polygon and the connected area border, or may be the outline of the connected area. The initial outline may be determined only from the image data of first and second frames, or may be determined from two adjacent frame images for each constant frame interval.

The outline modification renewal apparatus 104 employs the outer outline of the connected area after the area growth when the initial outline is set inside the clustered area of the extracted moving vector, or employs the inner outline of the connected area in the opposite case.

Since the characteristic amount extraction apparatuses 98, 100, area growth apparatus 102, outline determination apparatus 106 and processing result output apparatus 108 operate in the similar manner to the characteristic amount extraction apparatus 22, area growth apparatus 26, outline determination apparatus 30 and processing result output apparatus 32 of FIG. 2 with respect to each frame of the input image, the detailed description thereof is omitted.

As can easily be understood from the above description, according to the present invention, only by giving a rough instruction (initial outline setting) concerning the extraction object or the non-extraction object (background), the convergence is automatically judged based on the predetermined characteristic amounts such as the edge ratio on the outline to automatically appropriately set the area growth threshold value, and the extraction of the outline shape of the object with the arbitrary shape and the image extraction of the inner area if necessary can automatically be performed. The standard values of the characteristic amounts (color component, and the like) for the representative points are determined in the area growth centering on the representative points. Therefore, even when a large number of color components are distributed in the background or the extraction object, the borderline of the area to be separated can faithfully be extracted, and the image of the extraction object area can be cut out.

Moreover, since the information concerning the rough shape of the object (extraction object) is automatically obtained based on the moving vector to set the approximate outline (initial outline) concerning the object, only the moving object can highly precisely and automatically be extracted from the animation.

What is claimed is:

1. An image extracting method comprising the steps of:
    setting a core by designating at least one of a predetermined point, line segment and area in an image;
    calculating an evaluation function including a texture characteristic amount in a local area, the local area including at least one standard point corresponding to the core; and
    determining a borderline of a predetermined area in the image by renewing a shape of the core based on a value of the evaluation function,
    wherein said step of calculating an evaluation function comprises
       determining an attention point using a predetermined method;
       determining a first distance between the attention point and the at least one standard point in a characteristic space based on a color component characteristic amount;
       determining a second distance between the attention point and the at least one standard point in a characteristic space based on a texture characteristic amount; and
       weighting and adding the first distance and the second distance, wherein weighting factors are determined based on a dispersion value concerning a shading value in a neighborhood of the at least one standard point, and
    wherein said step of determining a borderline comprises
       obtaining a similarity between a neighborhood area of the at least one standard point and a neighborhood area of the attention point, based on a function value obtained by calculating the evaluation function;
       renewing the shape of the core by combining (i) the attention point or a neighborhood area of the attention point and (ii) a predetermined extraction area that includes the at least one standard point, when the similarity is larger than a predetermined threshold value; and
       renewing the shape of the core by removing the attention point and the neighborhood area from the extraction area when the similarity is equal to or less than the threshold value and the attention point is included in the extraction area.

2. The image extracting method according to claim 1, wherein the evaluation function is represented as a function of a predetermined occurrence probability value concerning the texture characteristic amount in the vicinity of the standard point, and the core shape is renewed by moving each standard point by a predetermined amount in a direction in which the function value of the evaluation function is maximized.

3. The image extracting method according to claim 1 wherein when a value of an edge ratio of the point on the borderline of the core reaches a predetermined standard value or more, a renewal processing of the extraction area is automatically stopped.

4. The image extracting method according to claim 1, wherein when an absolute value of a change rate of an edge ratio of the point on the borderline of the core reaches a predetermined standard value or less, a renewal processing of the extraction area is automatically stopped.

5. The image extracting method according to claim 1, wherein the threshold value is renewed based on a signal from predetermined instruction selection means.

6. The image extracting method according to claim 1, wherein the evaluation function is a predetermined energy function including a term for giving a minimum value in a border of the texture characteristic amount, and the core shape is renewed by moving a position of each standard point in a direction in which the function value of the evaluation function is minimized.

7. The image extracting method according to claim 1, wherein the first distance is represented by a weighted sum of differences between, for each color component, a value of the at least one standard point and a value of the attention point, or the absolute values of the differences, and the second distance is represented by the weighted sum of differences between, for each texture characteristic component, a value of the at least one standard point and a value of the attention point or the absolute values of the differences.

8. The image extracting method according to claim 1, wherein the first distance is represented by a weighted sum of differences between, for each color component, a value of the at least one standard point and a value of the attention point or the absolute value of the differences, and the second distance is represented by a predetermined function value of the differences, for an energy value represented by a weighted sum of texture characteristic components, between a value of the at least one standard point and a value of the attention point or the absolute value of the differences.

9. An image extracting method comprising:
    a core setting step of setting a core by designating at least one of a predetermined point, line segment and area in an image;
    a standard point setting step of setting a representative point on the core as a standard point;
    a similarity calculating step of obtaining a similarity of a neighborhood area of the standard point and a neighborhood area of an attention point, said similarity calculating step comprising the steps of determining an attention point using a predetermined method;

determining a first distance between the attention point and the at least one standard point in a characteristic space based on a color component characteristic amount;

determining a second distance between the attention point and the at least one standard point in a characteristic space based on a texture characteristic amount; and weighting and adding the first distance and the second distance, wherein weighting factors are determined based on a dispersion value concerning a shading value in the neighborhood of the standard point;

an extraction area renewing step of combining the attention point or a neighborhood area with a predetermined extraction area including the standard point, when the similarity is larger than a predetermined threshold value, or removing the attention point or the neighborhood area from the extraction area when the similarity is equal to or less than the threshold value and when the attention point is included in the extraction area, to renew a borderline of the extraction area; and a borderline display step of displaying the borderline of the extraction area after renewal.

10. The image extracting method according to claim 9, wherein the extraction area renewing step comprises a threshold value renewing step of increasing or decreasing the threshold value for each renewal of the borderline in a predetermined method.

11. The image extracting method according to claim 10, wherein the threshold value renewing step comprises an edge ratio calculating step of calculating a ratio of a point on the predetermined borderline on the extraction area being an edge point, and a renewing step of renewing the threshold value based on one of a value of the edge ratio and a change rate.

12. The image extracting method according to claim 9, wherein the threshold value is renewed based on a signal from predetermined instruction selection means.

13. The image extracting method according to claim 9, wherein the first distance is represented by a weighted sum of differences between, for each color component, a value of the at least one standard point and a value of the attention point, or the absolute values of the differences, and the second distance is represented by the weighted sum of differences between, for each texture characteristic component, a value of the at least one standard point and a value of the attention point or the absolute values of the differences.

14. The image extracting method according to claim 9, wherein the first distance is represented by a weighted sum of differences between, for each color component, a value of the at least one standard point and a value of the attention point or the absolute value of the differences, and the second distance is represented by a predetermined function value of the differences, for an energy value represented by a weighted sum of texture characteristic components, between a value of the at least one standard point and a value of the attention point or the absolute value of the differences.

15. An image extracting method comprising:

an initial outline setting step of setting an initial outline present inside or outside an object to be extracted;

a standard point setting step of setting a representative point of a plurality of predetermined representative points on the initial outline as a standard point;

a similarity calculating step of obtaining a similarity of a neighborhood area of the standard point and a neighborhood area of an attention point, wherein said similarity calculating step comprises the steps of determining an attention point using a predetermined method;

determining a first distance between the attention point and the standard point based in a characteristic space based on a color component characteristic amount;

determining a second distance between the attention point and the standard point in a characteristic space based on a texture characteristic amount; and weighting and adding the first distance and the second distance, wherein weighting factors are determined based on a dispersion value concerning a shading value in a neighborhood of the standard point;

an extraction area renewing step of combining the attention point or a neighborhood area with a predetermined extraction area including the standard point, when the similarity is larger than a predetermined threshold value, or removing the attention point or the neighborhood area from the extraction area when the similarity is equal to or less than the threshold value and when the attention point is included in the extraction area, to renew a borderline of the extraction area a predetermined number of times; and a threshold value setting step of determining the threshold value based on an edge ratio on an inner borderline of the renewed extraction area when the entire initial outline is present outside the object, or determining the threshold value based on the edge ratio on an outer borderline of the renewed extraction area when the entire initial outline is present inside the object.

16. The image extracting method according to claim 15, wherein the first distance is represented by a weighted sum of differences between, for each color component, a value of the at least one standard point and a value of the attention point, or the absolute values of the differences, and the second distance is represented by the weighted sum of differences between, for each texture characteristic component, a value of the at least one standard point and a value of the attention point or the absolute values of the differences.

17. The image extracting method according to claim 15, wherein the first distance is represented by a weighted sum of differences between, for each color component, a value of the at least one standard point and a value of the attention point or the absolute value of the differences, and the second distance is represented by a predetermined function value of the differences, for an energy value represented by a weighted sum of texture characteristic components, between a value of the at least one standard point and a value of the attention point or the absolute value of the differences.

18. An image extraction apparatus comprising:

core setting means for setting a core by designating at least one of a predetermined point, line segment and area in an image;

calculating means for calculating an evaluation function including a texture characteristic amount in a local area, the local area including at least one standard point corresponding to the core; and determining means for determining a borderline of a predetermined area in the image by renewing a shape of the core based on a value of the evaluation function, wherein said calculating means comprises means for determining an attention point using a predetermined method;

means for determining a first distance between the attention point and the at least one standard point in a characteristic space based on a color component characteristic amount;

means for determining a second distance between the attention point and the at least one standard point in a characteristic space based on a texture characteristic amount; and means for weighting and adding the first distance and the second distance, wherein weighting factors are determined based on a dispersion value concerning a shading value in a neighborhood of the at least one standard point, and wherein said determining means for determining a borderline comprises means for obtaining a similarity between a neighborhood area of the at least one standard point and a neighborhood area of the attention point, based on a function value obtained by calculating the evaluation function; and means for (a) renewing the shape of the core by combining (i) the attention point or a neighborhood area of the attention point and (ii) a predetermined extraction area that includes the at least one standard point, when the similarity is larger than a predetermined threshold value, and for (b) renewing the shape of the core by removing the attention point and the neighborhood area from the extraction area when the similarity is equal to or less than the threshold value and the attention point is included in the extraction area.

19. An image extraction apparatus comprising:

core setting means for setting a core by designating at least one of a predetermined point, line segment and area in an image;

standard point setting means for setting a representative point on the core as a standard point;

similarity calculating means for obtaining a similarity of a neighborhood area of the standard point and a neighborhood area of an attention point, said similarity calculating means comprising means for determining an attention point using a predetermined method;

means for determining a first distance between the attention point and the at least one standard point in a characteristic space based on a color component characteristic amount;

means for determining a second distance between the attention point and the at least one standard point in a characteristic space based on a texture characteristic amount; and means for weighting and adding the first distance and the second distance, wherein weighting factors are determined based on a dispersion value concerning a shading value in the neighborhood of the standard point;

extraction area renewing means for combining the attention point or a neighborhood area with a predetermined extraction area including the standard point, when the similarity is larger than a predetermined threshold value, or removing the attention point or the neighborhood area from the extraction area when the similarity is equal to or less than the threshold value and when the attention point is included in the extraction area, to renew a borderline of the extraction area; and borderline display means or displaying the borderline of the extraction area after renewal.

20. An image extraction apparatus comprising;

initial outline setting means for setting an initial outline present inside or outside an object to be extracted;

standard point setting means for setting a representative point of a plurality of predetermined representative points on the initial outline as a standard point;

similarity calculating means for obtaining a similarity of a neighborhood area of the standard point and a neighborhood area of an attention point, wherein said similarity calculating means comprises means for determining an attention point using a predetermined method;

means for determining a first distance between the attention point and the standard point based in a characteristic space based on a color component characteristic amount;

means for determining a second distance between the attention point and the standard point in a characteristic space based on a texture characteristic amount; and means for weighting and adding the first distance and the second distance, wherein weighting factors are determined based on a dispersion value concerning a shading value in a neighborhood of the standard point;

extraction area renewing means for combining the attention point or a neighborhood area with a predetermined extraction area including the standard point, when the similarity is larger than a predetermined threshold value, or removing the attention point or the neighborhood area from the extraction area when the similarity is equal to or less than the threshold value and when the attention point is included in the extraction area, to renew a borderline of the extraction area a predetermined number of times; and threshold value setting means for determining the threshold value based on an edge ratio on an inner borderline of the renewed extraction area when the entire initial outline is present outside the object, or determining the threshold value based on the edge ratio on an outer borderline of the renewed extraction area when the entire initial outline is present inside the object.

21. A storage medium for storing a program, said program comprising the steps of:

setting a core by designating at least one of a predetermined point, line segment and area in an image;

calculating an evaluation function including a texture characteristic amount in a local area, the local area including at least one standard point corresponding to the core, and renewing a shape of the core based on a value of the evaluation function to determine a borderline of a predetermined area in the image, wherein said step of calculating an evaluation function comprises determining an attention point using a predetermined method;

determining a first distance between the attention point and the at least one standard point in a characteristic space based on a color component characteristic amount;

determining a second distance between the attention point and the at least one standard point in a characteristic space based on a texture characteristic amount; and weighting and adding the first distance and the second distance, wherein weighting factors are determined based on a dispersion value concerning a shading value in a neighborhood of the at least one standard point, and wherein said step of renewing a shape of the core comprises obtaining a similarity between a neighborhood area of the at least one standard point and a neighborhood area of the attention point, based on a function value obtained by calculating the evaluation function, renewing the shape of the core by combining (i) the attention point or a neighborhood area of the attention point and (ii) a predetermined extraction area that includes the at least one standard point, when the similarity is larger than a predetermined threshold value; and renewing the shape of the core by removing the attention point and the neighborhood area from the extraction area when the similarity is equal to or less than the threshold value and the attention point is included in the extraction area.

22. A storage medium for storing a program, said program comprising the steps of:

setting a core by designating at least one of a predetermined point, line segment and area in an image;

setting a representative point on the core as a standard point;

obtaining a similarity of a neighborhood area of the standard point and a neighborhood area of an attention point, said similarity calculating step comprising the steps of determining an attention point using a predetermined method;

determining a first distance between the attention point and the at least one standard point in a characteristic space based on a color component characteristic amount;

determining a second distance between the attention point and the at least one standard point in a characteristic space based on a texture characteristic amount; and weighting and adding the first distance and the second distance, wherein weighting factors are determined based on a dispersion value concerning a shading value in the neighborhood of the standard point;

combining the attention point or a neighborhood area with a predetermined extraction area including the standard point, when the similarity is larger than a predetermined threshold value, or removing the attention point or the neighborhood area from the extraction area when the similarity is equal to or less than the threshold value and when the attention point is included in the extraction area, to renew a borderline of the extraction area; and displaying the borderline of the extraction area after renewal.

23. A storage medium for storing a program, said program comprising the steps of:

setting an initial outline present inside or outside an object to be extracted;

setting a representative point of a plurality of predetermined representative points on the initial outline as a standard point;

obtaining a similarity of a neighborhood area of the standard point and a neighborhood area of an attention point, wherein said step of obtaining a similarity comprises the steps of determining an attention point using a predetermined method;

determining a first distance between the attention point and the standard point based in a characteristic space based on a color component characteristic amount;

determining a second distance between the attention point and the standard point in a characteristic space based on a texture characteristic amount; and weighting and adding the first distance and the second distance, wherein weighting factors are determined based on a dispersion value concerning a shading value in a neighborhood of the standard point;

combining the attention point or a neighborhood area with a predetermined extraction area including the standard point, when the similarity is larger than a predetermined threshold value, or removing the attention point or the neighborhood area from the extraction area when the similarity is equal to or less than the threshold value and when the attention point is included in the extraction area, to renew a borderline of the extraction area a predetermined number of times; and determining the threshold value based on an edge ratio on an inner borderline of the renewed extraction area when the entire initial outline is present outside the object, or determining the threshold value based on the edge ratio on an outer borderline of the renewed extraction area when the entire initial outline is present inside the object.

* * * * *

UNITED STATES PATENT AND TRADEMARK OFFICE
CERTIFICATE OF CORRECTION

PATENT NO. : 6,674,905 B1
DATED : January 6, 2004
INVENTOR(S) : Masakazu Matsugu et al.

It is certified that error appears in the above-identified patent and that said Letters Patent is hereby corrected as shown below:

Drawings,
Sheet 11, Fig. 13, Item S80, "GROUTH" should read -- GROWTH --.

Column 1,
Line 13, "includes;" should read -- includes: --.

Column 11,
Line 8, "procedure" should read -- procedure. --.
Line 22, "is curve" should read -- curve --.

Column 15,
Line 58, "In" should read -- in --.

Column 16,
Line 40, "z" should read -- s -- (both occurrences).
Line 45, "$N_z$" should read -- $N_s$ -- (both occurences).
Line 61, "Is" should read -- is --.

Column 19,
Line 50, "Is" should read -- is --; and
Line 66, "´σ" should read -- $y'_\sigma$ --.

Column 21,
Line 10, "This" should read -- Th is --.
Line 51, "Is" should read -- is --.
Line 58, "can" should read -- can be --.

Column 24,
Line 19, "claim 1" should read -- claim 1, --.

UNITED STATES PATENT AND TRADEMARK OFFICE
CERTIFICATE OF CORRECTION

PATENT NO. : 6,674,905 B1
DATED : January 6, 2004
INVENTOR(S) : Masakazu Matsugu et al.

It is certified that error appears in the above-identified patent and that said Letters Patent is hereby corrected as shown below:

<u>Column 28,</u>
Line 3, "comprising;" should read -- comprising: --.

Signed and Sealed this

Nineteenth Day of October, 2004

JON W. DUDAS
*Director of the United States Patent and Trademark Office*